US012717811B2

(12) United States Patent
Rossi et al.

(10) Patent No.: US 12,717,811 B2
(45) Date of Patent: Aug. 25, 2026

(54) TRAINING AND UTILIZING LANGUAGE MACHINE LEARNING MODELS TO CREATE STRUCTURED OUTPUTS FOR BUILDING DIGITAL VISUALIZATIONS FROM ANALYTICS DATABASES AND DIGITAL TEXT PROMPTS

(71) Applicant: Adobe Inc., San Jose, CA (US)

(72) Inventors: Ryan A Rossi, Santa Clara, CA (US); Sungchul Kim, San Jose, CA (US); Tung Mai, San Jose, CA (US); Tong Yu, San Jose, CA (US); Ritwik Sinha, Cupertino, CA (US); Prithvi Bhutani, Lynnwood, WA (US); Abhisek Trivedi, Lehi, UT (US); Said Kobeissi, Lovettsville, VA (US); Sam Grigg, Sandy, UT (US); Tyler Rasmussen, Bluffdale, UT (US); Brandon Mooso, South Jordan, UT (US); Jordan Walker, Lehi, UT (US); William Brandon George, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 192 days.

(21) Appl. No.: 18/409,240

(22) Filed: Jan. 10, 2024

(65) Prior Publication Data

US 2025/0225146 A1 Jul. 10, 2025

(51) Int. Cl.
*G06F 16/00* (2019.01)
*G06F 16/26* (2019.01)
(Continued)

(52) U.S. Cl.
CPC ............ *G06F 16/26* (2019.01); *G06F 16/283* (2019.01); *G06F 40/284* (2020.01); *G06F 40/40* (2020.01)

(58) Field of Classification Search
CPC ...... G06F 16/26; G06F 16/283; G06F 40/284; G06F 40/40; G06F 40/30
See application file for complete search history.

(56) References Cited

U.S. PATENT DOCUMENTS 10,515,121 B1 * 12/2019 Setlur ................. G10L 15/1815
10,877,970 B1 * 12/2020 Brochu .............. G06F 16/2457
(Continued)

OTHER PUBLICATIONS

Wang et al., "Applying machine learning advances to data visualization: A survey on ml4vis", arXiv preprint arXiv: 2012.00467, 2020, pp. 1-18 (Year: 2020).*
(Continued)

*Primary Examiner* — Polina G Peach
(74) *Attorney, Agent, or Firm* — Keller Preece PLLC

(57) ABSTRACT

The present disclosure relates to systems, methods, and non-transitory computer-readable media that generates a digital data visualization from data of an analytics database. In particular, in some embodiments, the disclosed systems receive a digital text prompt that includes a target digital data visualization description. Furthermore, in some embodiments the disclosed systems generate visualization token predictions from the digital text prompt utilizing a language machine learning model. Moreover, in some embodiments the disclosed systems modify the visualization token predictions to generate refined visualization tokens and generates the digital data visualization based on the refined visualization tokens.

20 Claims, 28 Drawing Sheets

(51) Int. Cl.

| | |
|---|---|
| ***G06F 16/28*** | (2019.01) |
| ***G06F 40/284*** | (2020.01) |
| ***G06F 40/40*** | (2020.01) |

(56) References Cited

U.S. PATENT DOCUMENTS

| | | | | |
|---|---|---|---|---|
| 11,321,538 | B1 * | 5/2022 | Fontecilla | G06F 40/284 |
| 11,625,163 | B2 * | 4/2023 | Nhan | G06F 3/04847<br>715/769 |
| 11,948,378 | B2 * | 4/2024 | Dey | G06V 10/82 |
| 12,164,548 | B1 * | 12/2024 | Deutsch | G06F 16/3329 |
| 12,260,079 | B2 * | 3/2025 | Kim | G06F 3/0482 |
| 12,265,528 | B1 * | 4/2025 | Lan | G06F 16/243 |
| 12,287,954 | B1 * | 4/2025 | Atallah | G06F 16/248 |
| 12,321,393 | B2 * | 6/2025 | Thomas | G06F 16/243 |
| 12,518,447 | B2 * | 1/2026 | Dibia | G06T 11/26 |
| 12,536,387 | B2 * | 1/2026 | Sobhy Deraz | G06F 40/18 |
| 2003/0176931 | A1 * | 9/2003 | Pednault | G06N 7/01<br>700/44 |
| 2018/0329987 | A1 * | 11/2018 | Tata | G06F 16/3344 |
| 2019/0318032 | A1 * | 10/2019 | Vangala | G06F 16/9024 |
| 2020/0089700 | A1 * | 3/2020 | Ericson | G06F 40/30 |
| 2020/0110803 | A1 * | 4/2020 | Djalali | G06F 40/242 |
| 2020/0293167 | A1 * | 9/2020 | Blyumen | G06F 3/0484 |
| 2021/0303558 | A1 * | 9/2021 | Setlur | G06F 16/24522 |
| 2021/0349950 | A1 * | 11/2021 | Setlur | G06F 16/24522 |
| 2022/0019947 | A1 * | 1/2022 | Mitelman | G06N 20/00 |
| 2022/0164540 | A1 * | 5/2022 | Setlur | G06F 40/30 |
| 2022/0237391 | A1 * | 7/2022 | Zhang | G06F 40/284 |
| 2022/0414320 | A1 * | 12/2022 | Dolan | G06F 40/166 |
| 2024/0028631 | A1 * | 1/2024 | Gong | G06F 16/3344 |
| 2024/0185490 | A1 * | 6/2024 | Dibia | G06N 20/10 |
| 2024/0232664 | A1 * | 7/2024 | De | G06F 40/30 |
| 2024/0303441 | A1 * | 9/2024 | Sobhy Deraz | G06T 11/206 |
| 2024/0338378 | A1 * | 10/2024 | Setlur | G06F 16/243 |
| 2024/0362208 | A1 * | 10/2024 | Naufel | G06F 16/243 |
| 2025/0007790 | A1 * | 1/2025 | Marwah | H04L 41/16 |
| 2025/0068627 | A1 * | 2/2025 | Hoang | G06F 16/24573 |
| 2025/0094703 | A1 * | 3/2025 | Malak | G06F 40/20 |
| 2025/0200030 | A1 * | 6/2025 | Yadav | G06F 16/248 |

OTHER PUBLICATIONS

Dibia, Victor. “LIDA: A tool for automatic generation of grammar-agnostic visualizations and infographics using large language models.” Proceedings of the 61st Annual Meeting of the Association for Computational Linguistics (vol. 3: System Demonstrations). 2023 (Year: 2023).*

* cited by examiner

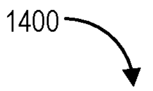
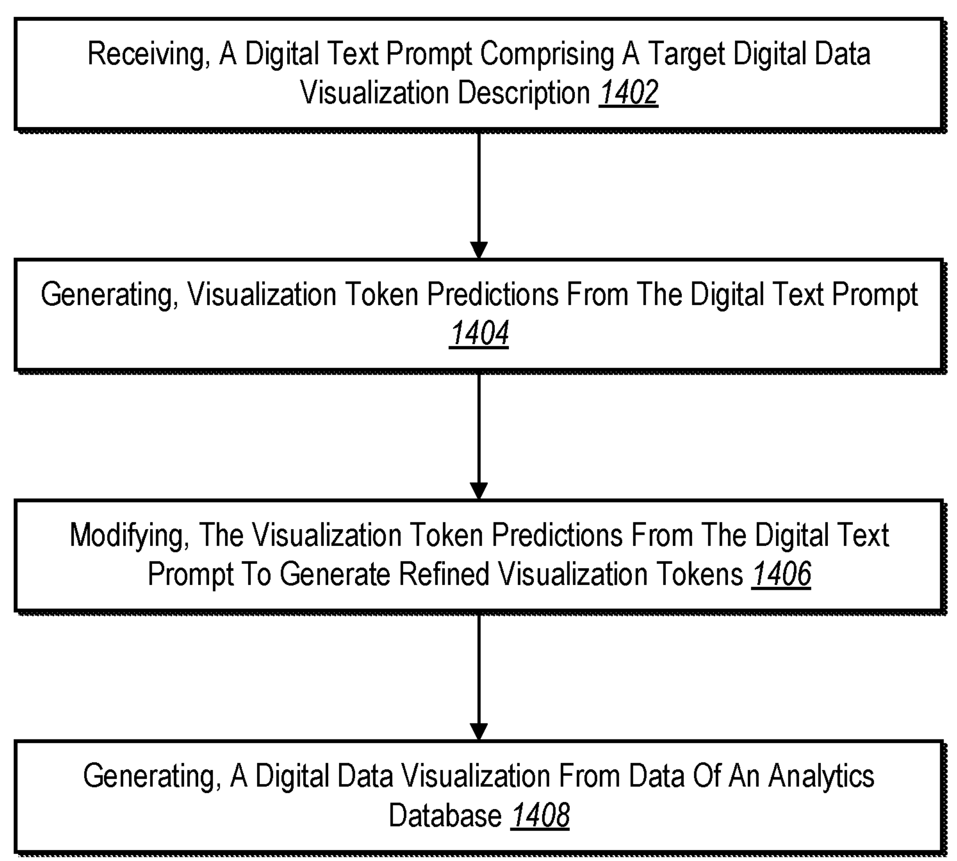
*Fig. 14*

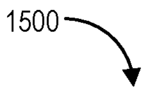

Generating, A Dataset Of Text-Visualization Structure Pairs 1502

Receiving, A Training Template 1502a

Populating, Feature Fields Of The Training Template Based On A Structural Feature Token To Generate A Training Digital Text Prompt 1502b Training, A Language Machine Learning Model With The Dataset 1504

Generating, A Visualization Token Prediction From The Training Digital Text Prompt 1504a Modifying, Parameters Of The Language Machine Learning Model 1504b

*Fig. 15*

TRAINING AND UTILIZING LANGUAGE MACHINE LEARNING MODELS TO CREATE STRUCTURED OUTPUTS FOR BUILDING DIGITAL VISUALIZATIONS FROM ANALYTICS DATABASES AND DIGITAL TEXT PROMPTS

BACKGROUND

Recent years have seen significant improvements in hardware and software platforms for generating digital visualizations from large digital data repositories. To illustrate, conventional systems often collect and manage large digital data volumes including, for example, computer device interactions with digital content deployed across the internet or other computer networks. In some implementations, conventional systems receive user interactions with various interface elements to build digital visualizations from these large digital data volumes. Although conventional systems generate digital visualizations, such systems suffer from a number of technical deficiencies including inefficiency, inaccuracy, and operational inflexibility of implementing computing devices.

As just mentioned, conventional systems often suffer from computational inefficiencies. For example, the amount of analytics data a system may collect for even a single website or application may be difficult to manage or mine due to its overwhelming volume. To create visualizations of data, conventional systems require client devices to perform an excessive number of interactions. For instance, conventional systems require administrator devices to identify the correct data features and portions of analytics data based on user interactions with a variety of graphical user interfaces and interactive elements.

Furthermore, conventional systems further suffer from computational inefficiencies due to excessive shuffling between various user interfaces. For example, as mentioned, the amount of analytics data typically collected results in a large volume of data. Further, the large volume of data has a wide range of naming conventions for various attributes that differ between different sets of websites or applications (e.g., an administrator device may oversee multiple accounts that correspond with different sets of websites or applications and each of the different sets can have different naming conventions for data attribute types). As such, administrator devices in prior systems typically must first identify the correct naming conventions for a relevant portion of data to visualize and further identify the relevant portions of data within the analytics database. In doing so, prior data visualization systems suffer from additional inefficiencies of shuffling between multiple different interfaces for creating data visualizations.

Relatedly, in one or more implementations, prior data visualization systems suffer from computational inaccuracies. For example, as mentioned, conventional systems typically require administrator devices to identify the correctly named portions of data attributes that can differ between sets of websites or applications and must further sift through large volumes of data. This process often results in incorrectly identifying data attributes and generating inaccurate and incomplete data visualizations (e.g., selecting the wrong option for generating a visualization or failing to correctly select the correct data attributes).

Moreover, in one or more implementations, prior data visualization systems suffer from operational inflexibility. For example, as mentioned, prior systems are rigidly limited to generating data visualizations based on user interactions and identifying the correct portions of data/the correct naming conventions between different sets of websites or applications. Accordingly, prior systems are typically limited to generating data visualizations utilizing rigid processes limited to time constraints and data sifting capabilities of client devices.

SUMMARY

This disclosure describes one or more embodiments that provide benefits and/or solve some or all of the foregoing problems with systems and methods that fine-tune a language machine learning model with a dataset of text-visualization structure pairs and generates visualization token predictions from a digital text prompt to generate digital data visualizations from digital text prompts. For example, in one or more embodiments, the disclosed systems utilize a generative model that allows clients to quickly generate digital visualizations from underlying data by providing a text prompt indicating the desired data to analyze and corresponding visualization In particular, the disclosed system utilizes a hybrid approach that implements a fine-tuned large language model along with post-processing techniques to generate robust and correct visualizations. Thus, the disclosed systems can fine-tune a large language mode utilizing specific fine-tuning data for this task, implement post-processing techniques applied over generated structure from the LLM to generate improved digital visualizations.

For example, in certain embodiments the disclosed systems receive a digital text prompt, generates (utilizing a generative language machine learning model) visualization token predictions from the digital text prompt, and further modifies the visualization token predictions utilizing a post-processing model to generate refined visualization tokens. Specifically, the disclosed systems train a language machine learning model (e.g., a large language model) to generate visualization token predictions for a variety of different visualization attributes. Furthermore, the disclosed systems at inference time, utilize a post-processing model to refine or tweak predicted visualization tokens such that the refined visualization tokens are aligned or tailored to search and generate digital visualizations from an analytics database (e.g., a customer or organization specific database). Accordingly, the disclosed systems efficiently and accurately generate digital data visualization from data of an analytics database based on the refined visualization tokens.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 14 illustrates a flowchart of a series of acts for generating, a digital data visualization in accordance with one or more embodiments;

FIG. 15 illustrates a flowchart of a series of acts for training, a language machine learning model in accordance with one or more embodiments;

DETAILED DESCRIPTION

Figure 1:
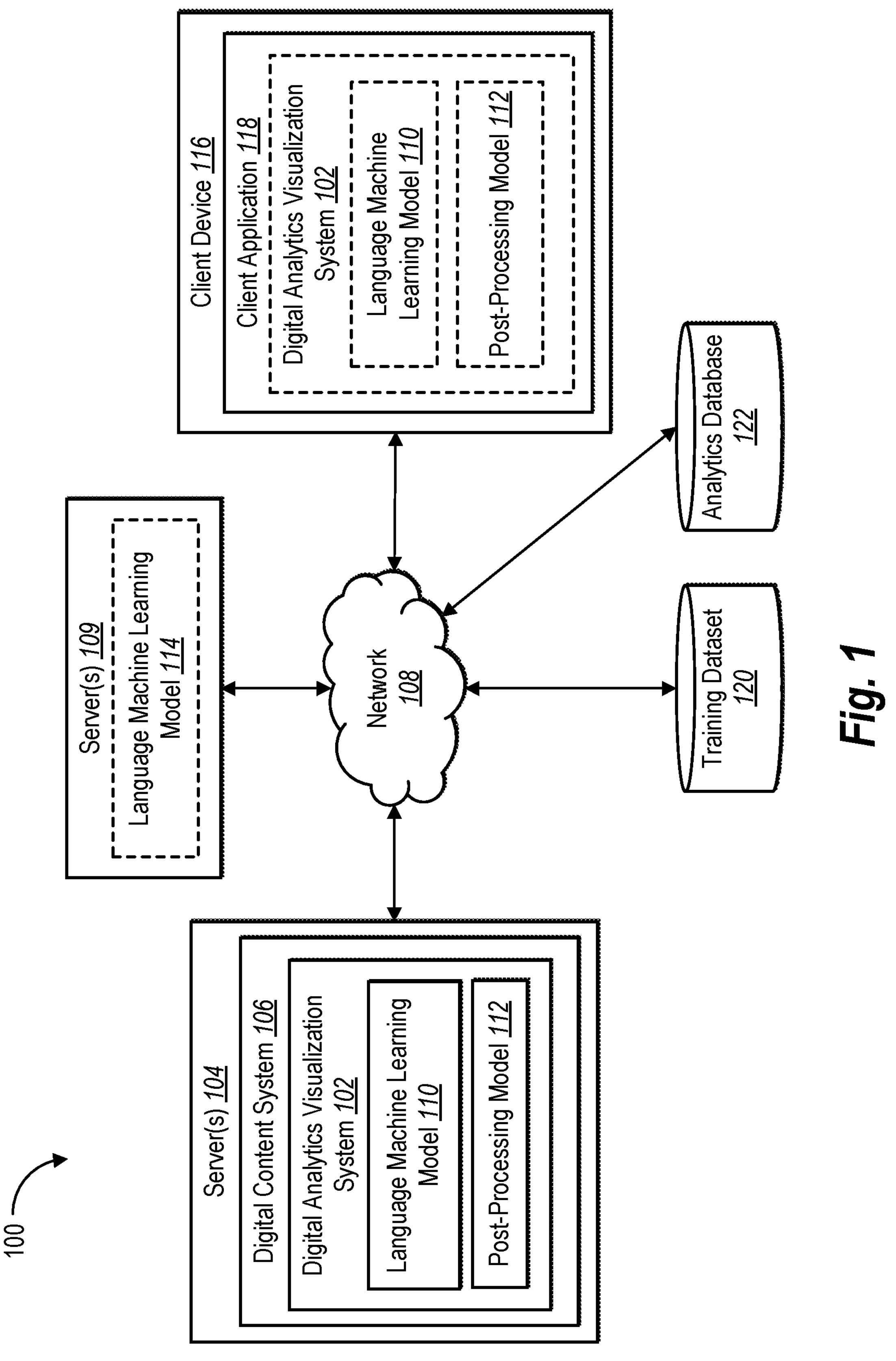
FIG. 1 illustrates an example environment in which a digital analytics visualization system operates in accordance with one or more embodiments.

This disclosure describes one or more embodiments of a digital analytics visualization system that trains and utilizes generative language machine learning models to create structured outputs for building digital visualizations from analytics databases and digital text prompts. In particular, the digital analytics visualization system for text-to-visualization generation that takes a text query as input and generates one or more visualizations in real-time. For example, in some embodiments, the digital analytics visualization system trains a generative model (e.g., a language machine learning model) utilizing training text-structure visualization pairs. In doing so, the digital analytics visualization system creates a language machine learning model (e.g., a fine-tuned large language model) trained to generate refined visualization tokens (e.g., JSON structured outputs for generating a query for building a digital visualization) from a digital text prompt. The digital analytics visualization system also utilizes post-processing routines to correct predictions and match attributes in the structure output to the actual attributes within an analytics database. In this manner, the digital analytics visualization system can accurately and efficiently generate a digital data visualization tailored to an analytics database in real-time based on flexible text prompts from a client device.

As mentioned above, in some embodiments, the digital analytics visualization system trains a generative language machine learning model, such as a large language model. For example, the digital analytics visualization system fine-tunes the language machine learning model by generating text-visualization structure pairs. Specifically, the digital analytics visualization system extracts tokens from ground truth data visualizations. For instance, the digital analytics visualization system populates a set of training templates with values of the extracted tokens to create training digital text prompts paired with a corresponding ground truth structure visualization. Further, in some embodiments, the digital analytics visualization system determines a measure of loss from the text-visualization structure pairs to modify parameters of the language machine learning model. Moreover, in some embodiments, the template approach allows for the digital analytics visualization system to train any state-of-the-art language machine learning model to perform data visualization tasks.

In one or more embodiments, the digital analytics visualization system generates visualization token predictions. For example, the digital analytics visualization system receives a digital text prompt based on user interaction with a machine learning model. The digital analytics visualization system utilizes a language machine learning model to generate visualization token prediction (e.g., a structured output) from the digital text prompt. Moreover, in some implementations the digital analytics visualization system utilizes a post-processing model to analyze and modifies the structured outputs to conform with attributes, features, and schemas specific to a particular analytics database (e.g., a customer or organization specific analytics database). To illustrate, in one or more embodiments, the visualization token prediction includes an initial visualization value, an initial segment value, an initial time range value, and an initial number of items value, which the digital analytics visualization system modifies to match with a value within an analytics database.

As mentioned above, in one or more embodiments, the digital analytics visualization system generates visualizations from text using a post-processing model. For example, the digital analytics visualization system generates the visualization token predictions via the language machine learning model and further utilizes the post-processing model to refine the visualization token predictions. Specifically, in some embodiments, the digital analytics visualization system utilizes the post-processing model to correct inconsistencies such as undesired fields and resolving the attribute types by matching them with attributes from the analytics database (e.g., customer or organization specific database). Moreover, in some embodiments, the digital analytics visualization system further utilizes the post-processing model to infer the intention (e.g., a comparison of data, or a distribution of data), identify a relevant time range for the prompt, and/or identify a relevant segment, among other tasks.

In one or more embodiments, the digital analytics visualization system establishes an inference pipeline that includes the language machine learning model, the post-processing model, and a visualization recommendation model to build the actual visualization from the refined visualization token. Accordingly, in one or more embodiments, the digital analytics visualization system provides an end-to-end system that receives digital text prompts with a target data visualization and effectively generates a digital data visualization that captures the description of the digital text prompt. Moreover, in some embodiments, the digital analytics visualization system allows for additional digital text prompts to modify the initially generated digital data visualization.

In one or more embodiments, during inference time, the digital analytics visualization system continually modifies (e.g., finetunes) parameters of the language machine learning model to improve the accuracy of the digital analytics visualization system in generating visualization token predictions. For example, at inference time, the digital analytics visualization system utilizes both implicit and explicit feedback from users to modify parameters of the language machine learning model.

As mentioned above, conventional systems suffer from a variety of issues in relation to inefficiency, inaccuracy, and operational inflexibility. The digital analytics visualization system provides a variety of technical benefits relative to such conventional systems. For example, in one or more embodiments, the digital analytics visualization system improves efficiency of implementing devices by reducing excess interactions to create a digital data visualization. Although the digital analytics visualization system also works with a large volume of data, in some embodiments, the digital analytics visualization system utilizes a digital text prompt to generate the digital data visualization (e.g., rather than requiring a client devices to identify correct portions of the analytics data and to sift through a large volume of data). Specifically, in some embodiments, the digital analytics visualization system utilizes a language machine learning model to generate visualization token predictions from the digital text prompt, utilizes a post-processing model to generate refined visualization tokens, and generates digital data visualizations from the refined visualization tokens. As such, in some embodiments, the digital analytics visualization system takes text instructions and translates those instructions to a refined visualization structure to efficiently generate a data visualization (e.g., without requiring an excessive number of operations, such as drag and drop operations).

Moreover, in one or more embodiments, the digital analytics visualization system further improves efficiency by eliminating the need for excessive shuffling between various interfaces (e.g., to locate naming conventions or other identifiers for various data attributes). Indeed, in one or more embodiments, the digital analytics visualization system utilizes the language machine learning model and post-processing model to align the visualization token predictions (e.g., the outputs from the language machine learning model) with actual values within the analytics database. Thus, in one or more implementations, the digital analytics visualization system intelligently tailors predictive outputs to match the specifics of a customer or organization specific database.

Further, in one or more embodiments, the digital analytics visualization system further improves upon accuracy by generating digital data visualizations that accurately reflect pertinent attributes and features of digital text prompts. For instance, as mentioned above, the digital analytics visualization system generates and refines visualization token prediction to accurately generate visualization tokens that align requested data from a digital text prompt to particular attributes of an analytics database. Accordingly, in one or more embodiments, the digital analytics visualization system accurately generates digital data visualizations that reflect the desired characteristics provided via a digital text prompt.

Moreover, in one or more embodiments, the digital analytics visualization system further improves upon operational flexibility. Rather than relying on repeated user interactions (e.g., drag and drop operations) to identify data attributes and features to create data visualizations, in one or more embodiments, the digital analytics visualization system establishes an end-to-end pipeline that receives as input a digital text prompt and outputs a digital data visualization that conforms with the target digital data visualization description within the text prompt. Moreover, in some embodiments, the digital analytics visualization system generates an accurate digital data visualization that conforms with the specifics of a analytics database by using the processes described above and in additional detail below. As such, in some embodiments, the digital analytics visualization system provides enhanced operational flexibility in generating digital data visualizations that does not rely on particular interactions with a plurality of selectable options from an administrator device.

As demonstrated from the discussion above, the current application uses a variety of terms and phrases to describe the digital analytics visualization system. In one or more embodiments, “a digital text prompt” refers to a verbal message or instruction (e.g., indicating a target digital data visualization). For instance, the digital text prompt includes a text description (e.g., received from a voice input device or text input device), that in some embodiments includes words that refer to target attribute types (e.g., certain dimensions or metrics). Additionally, in some embodiments, the digital text prompt contains a first order query, while in some embodiments the digital text prompt contains a multi-order query. In other words, in some embodiments, the digital text prompt indicates a single task, while in some embodiments, the digital text prompt indicates multiple tasks (e.g., compare x and y by z and also compare a and b by c). Further, in some embodiments, the digital text prompt also includes implicit indications (e.g., a quantity or a descriptor word that points to a certain type of visualization) and/or explicit words (e.g., words that expressly indicate a specific type of visualization) that guide the digital analytics visualization system in generating the target digital data visualization.

As mentioned above, the digital analytics visualization system receives the digital text prompt from a user interaction of a client device. In one or more embodiments, “a user interaction” refers to an input from a user of a client device. For example, the user interaction includes textual inputs, audio inputs, or gestures (e.g., selecting a suggestion on the user interface provided by the digital analytics visualization system).

In one or more embodiments a “machine learning model” includes a computer algorithm or a collection of computer algorithms that can be trained and/or tuned based on inputs to approximate unknown functions. For example, a machine learning model can include a computer algorithm with branches, weights, or parameters that changed based on training data to improve for a particular task. Thus, a machine learning model can utilize one or more learning techniques to improve in accuracy and/or effectiveness.

Example machine learning models include various types of decision trees, support vector machines, Bayesian networks, random forest models, or neural networks (e.g., deep neural networks).

Similarly, a "neural network" includes a machine learning model of interconnected artificial neurons (e.g., organized in layers) that communicate and learn to approximate complex functions and generate outputs based on a plurality of inputs provided to the model. In some instances, a neural network includes an algorithm (or set of algorithms) that implements deep learning techniques that utilize a set of algorithms to model high-level abstractions in data. To illustrate, in some embodiments, a neural network includes a convolutional neural network, a recurrent neural network (e.g., a long short-term memory neural network), a transformer neural network, a generative adversarial neural network, a graph neural network, a diffusion neural network, or a multi-layer perceptron. In some embodiments, a neural network includes a combination of neural networks or neural network components.

Relatedly, the digital analytics visualization system receives the digital text prompt via a machine learning model or neural network. In some instances, the digital analytics visualization system utilizes a language machine learning model (e.g., a large language model). For example, as used herein the term "language machine learning model" refers to artificial intelligence models capable of processing and generating natural language text. In particular, language machine learning models are trained on large amounts of data to learn patterns and rules of language. As such, language machine learning model post-training are capable of generating output predictions that indicate visualization structures. Further, in some embodiments, the language machine learning model includes or refers to one or more transformer-based neural networks capable of processing natural language text to generate outputs that range from predictive outputs, analyses, or combinations of data within stored content items (e.g., large language models and language transformer models). In particular, a language machine learning model includes parameters trained (e.g., via deep learning) on large amounts of data to learn patterns and rules of language for summarizing and/or generating digital content. Examples of language machine learning models include BLOOM, Bard AI, ChatGPT, LaMDA, DialoGPT.

As also mentioned, the digital analytics visualization system generates a visualization token prediction using the language machine learning model. In one or more embodiments, "visualization token predictions" output text/token predictions indicating visualization features based on a digital text prompt. For example, the visualization token predictions include an attribute value corresponding to an attribute key. Specifically, a visualization token prediction can include an attribute value and an attribute key extracted from description text. In other words, the digital analytics visualization system predicts an attribute key as indicated by a target attribute type within a digital text prompt, and further predicts an initial attribute value. As discussed later, in some implementations the disclosed system further utilizes a post-processing model to modify visualization token predictions.

As just mentioned, the visualization token prediction includes an attribute key. In one or more embodiments, the "attribute key" refers to a constant or label that identifies or defines a variable, field, data, or data set (e.g., corresponding to a digital visualization). For instance, the attribute key includes an indicator or label for digital data. To illustrate, the attribute key includes dimension keys (e.g., a label indicating that data corresponds to a dimension), metric keys (e.g., a label indicating that data corresponds to a metric), segment keys (e.g., a label indicating that data corresponds to a segment), time range keys (e.g., (e.g., a label indicating that data corresponds to a time range), a number of items keys (e.g., a label indicating that data corresponds to a number of items), and visualization keys (e.g., (e.g., a label indicating that data corresponds to a particular type or kind of visualization). Additional details related to teach of the aforementioned attribute keys is given below in the description of FIG. 7.

As also mentioned, the visualization token prediction includes an attribute value. In one or more embodiments, the term "attribute value" includes a variable or data that correspond to an attribute key. For example, an attribute value includes a variable for a dimension (e.g., geographic location, time period, product categories, and demographics), metric (e.g., page views, unique visitors, bounce rate, and conversion rate), segment (e.g., a subset of dimensions that subdivides broader categories such as demographic factors, behavioral factors, and geographic factors into smaller groups), time range (e.g., first quarter), number of items (e.g., 5), or visualization type (e.g., bar graph). Further, in some embodiments, the digital analytics visualization system generates an initial output prediction for an attribute value associated with the attribute key. Moreover, in some embodiments, after post-processing, the digital analytics visualization system replaces the initial attribute value with a replacement attribute value (e.g., that more accurately aligns with data from an analytics database).

As mentioned, in one or more embodiments, the digital analytics visualization system utilizes a post-processing model to modify the visualization token predictions. For example, a "post processing model" modifies, refines, or processes an initial visualization token predictions. Specifically, the post processing model analyzes initial visualization token predictions and (in some instances) replaces an initial attribute value of an attribute key with a modified attribute value from the analytics database. Thus, the digital analytics visualization system utilizes the post-processing model to generate refined visualization tokens. Additional details of the post-processing model are given below in the description of FIG. 8.

As just mentioned, the digital analytics visualization system utilizes the post-processing model to generate the refined visualization tokens. In one or more embodiments, the "refined visualization tokens" refer to modified, revised, or confirmed structured outputs (e.g., that conform with a schema and/or attributes of an analytics database). For example, refined visualization tokens includes attribute keys and/or attribute values modified, revised, confirmed, or aligned to a particular defined schema. Thus, the digital analytics visualization system can utilize the refined visualization tokens to build a digital data visualization.

As mentioned, in one or more embodiments, the digital analytics visualization system generates the digital data visualization form the refined visualization tokens. For example, the "digital data visualization" refers to a graphical representation of data (e.g., to portray patterns, trends, insights, and relationships within an analytics database). For instance, the digital data visualization includes graphics, maps, charts, tables, and diagrams. Further, a digital visualization can include bars, lines, points, colors, shapes, and additional visual indicators.

Moreover, as also mentioned, the digital analytics visualization system generates the digital data visualization using data from an analytics database. In one or more embodiments, an "analytics database" includes a repository of digital data (e.g., data of online/digital events or interactions between computing devices). For example, an analytics database stores and manages large volumes of digital data generated from various digital sources. Moreover, in some embodiments, the digital analytics visualization system associates an analytics database with a particular entity (e.g., a user account or a group of user accounts). For instance, different entities can store and access one or more different analytics databases. Furthermore, in some embodiments, the digital analytics visualization system grants access to a specific analytics database via a user of a client device providing a user authentication or access credential.

Additional details regarding the digital analytics visualization system will now be provided with reference to the figures. For example, FIG. 1 illustrates a schematic diagram of an exemplary system environment 100 in which a digital analytics visualization system 102 operates. As illustrated in FIG. 1, the system environment 100 includes a server(s) 104, a digital content system 106, a language machine learning model 110, a post-processing model 112, a network 108, a server(s) 109, a client device 116, a client application 118, a training dataset 120, and an analytics database 122.

Although the system environment 100 of FIG. 1 is depicted as having a particular number of components, the system environment 100 is capable of having a different number of additional or alternative components (e.g., a different number of servers, client devices, or other components in communication with the digital analytics visualization system 102 via the network 108). Similarly, although FIG. 1 illustrates a particular arrangement of the server(s) 104, the network 108, and the client device 116, various additional arrangements are possible.

The server(s) 104, the network 108, and the client device 116 are communicatively coupled with each other either directly or indirectly (e.g., through the network 108 discussed in greater detail below in relation to FIG. 16). Moreover, the server(s) 104 and the client device 116 include one or more of a variety of computing devices (including one or more computing devices as discussed in greater detail in relation to FIG. 16).

As mentioned above, the system environment 100 includes the server(s) 104. In one or more embodiments, the server(s) 104 via the digital analytics visualization system 102 trains a language model to create the language machine learning model 110 (e.g., a fine-tuned language machine learning model). In one or more embodiments, the server(s) 104 processes input to generate a digital data visualization from a digital text prompt of a user of the client application 118. In one or more embodiments, the server(s) 104 comprises a data server. In some implementations, the server(s) 104 comprises a communication server or a web-hosting server.

Further, in one or more embodiments, the system environment 100 includes the server(s) 109 which separately house a language machine learning model 114. For instance, the language machine learning model 114 is trained to process digital text prompts and output structured outputs (e.g., visualization token predictions). Accordingly, in some instances, the digital analytics visualization system 102 sends the digital text prompt to the server(s) 109 to utilize the language machine learning model 114.

Moreover, as mentioned, in some embodiments, the digital analytics visualization system 102 trains the language machine learning models 110 and 114. For example, in some embodiments, the digital analytics visualization system 102 accesses the training dataset 120 which contains text-visualization structure pairs to train the language machine learning models 110 and 114.

In one or more embodiments, the client device 116 includes a computing device that is able to provide for display a graphical user interface, elements within a graphical user interface such as interface panels for configuring an analysis and for generating digital data visualizations via the client application 118. For example, the client device 116 includes smartphones, tablets, desktop computers, laptop computers, head-mounted-display devices, or other electronic devices. The client device 116 includes one or more applications (e.g., a digital analytics application) for sending instructions to create one or more digital data visualizations in accordance with the digital content system 106. For example, in one or more embodiments, the client application 118 works in tandem with the digital analytics visualization system 102 to receive a digital text prompt, transform the digital text prompt into a refined visualization token, and further build a digital data visualization from the refined visualization token. In particular, the client application 118 includes a software application installed on the client device 116. Additionally, or alternatively, the client application 118 of the client device 116 includes a software application hosted on the server(s) 104 which may be accessed by the client device 116 through another application, such as a web browser.

In one or more embodiments, the digital analytics visualization system 102 receives a digital text prompt from the client device 116 and generates a visualization token prediction via the language machine learning model 110. Further, in some embodiments, the digital analytics visualization system 102 utilizes the post-processing model 112 which is in communication with the analytics database 122 (e.g., associated with the client device 116), to generate a refined visualization token. In some embodiments, from the refined visualization token, the digital analytics visualization system 102 utilizes the post-processing model 112 to build the digital data visualization and provide the digital data visualization to the client device 116.

To provide an example implementation, in some embodiments, the digital analytics visualization system 102 on the server(s) 104 supports the digital analytics visualization system 102 on the client device 116. For instance, in some cases, the digital content system 106 on the server(s) 104 gathers data for the digital analytics visualization system 102. In response, the digital analytics visualization system 102, via the server(s) 104, provides the information to the client device 116. In other words, the client device 116 obtains (e.g., downloads) the digital analytics visualization system 102, the language machine learning model 110, and the post-processing model 112 from the server(s) 104. Once downloaded, the digital analytics visualization system 102 on the client device 116 provides one or more digital data visualizations based on one or more digital text prompts.

In alternative implementations, the digital analytics visualization system 102 includes a web hosting application that allows the client device 116 to interact with content and services hosted on the server(s) 104. To illustrate, in one or more implementations, the client device 116 accesses a software application supported by the server(s) 104. In response, the digital analytics visualization system 102 on the server(s) 104, utilizes the language machine learning model 110 and the post-processing model 112. The server(s) 104 provides the digital data visualizations to the client device 116 for display.

To illustrate, in some cases, the digital analytics visualization system 102 on the client device 116 receives a digital text prompt. The client device 116 transmits the digital text prompt to the server(s) 104. In response, the digital analytics visualization system 102 on the server(s) 104 determines a relevant digital data visualization to cause the client device 116 to display via the graphical user interface of the client application 118.

In alternative implementations, the system environment 100 includes multiple client devices (e.g., in addition to the client device 116), and additional analytics databases corresponding to the multiple client devices. In some instances, a client device can have access to one or more analytics databases.

Indeed, in some embodiments, the digital analytics visualization system 102 is implemented in whole, or in part, by the individual elements of the system environment 100. For instance, although FIG. 1 illustrates the digital analytics visualization system 102 implemented or hosted on the server(s) 104, different components of the digital analytics visualization system 102 are able to be implemented by a variety of devices within the system environment 100. For example, one or more (or all) components of the digital analytics visualization system 102 are implemented by a different computing device (e.g., the client device 116) or a separate server from the server(s) 104. Indeed, as shown in FIG. 1, the client device 116 includes the digital analytics visualization system 102. Example components of the digital analytics visualization system 102 will be described below with regard to FIG. 13.

Figure 2:
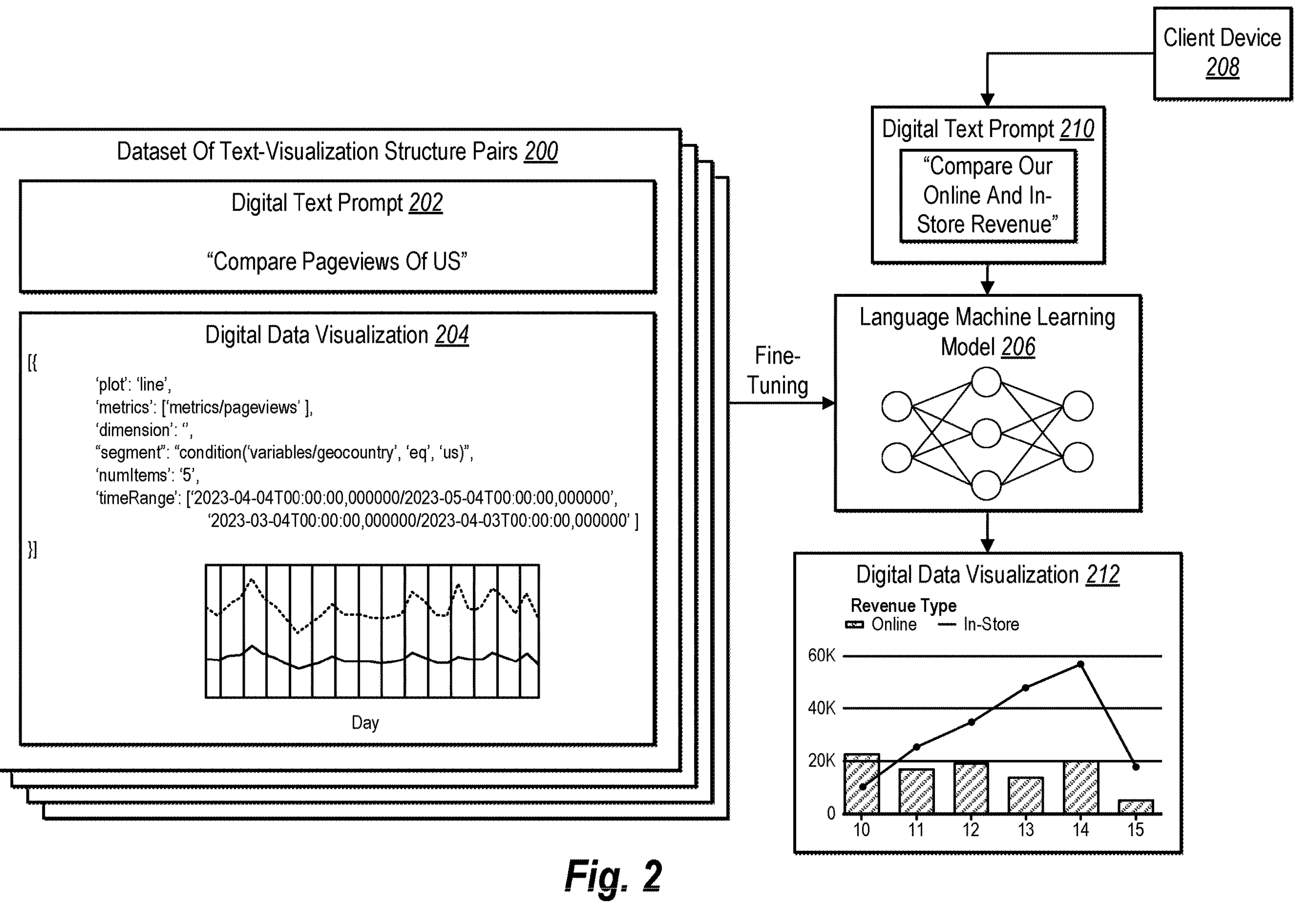
FIG. 2 illustrates an overview of the digital analytics visualization system training a language machine learning model and further generating a digital data visualization in accordance with one or more embodiments.

As mentioned above, in certain embodiments, the digital analytics visualization system 102 generates a digital data visualization using a trained language machine learning model. FIG. 2 illustrates an overview of the digital analytics visualization system 102 training a language machine learning model with a dataset of text-visualization structure pairs and further generating a digital data visualization from a digital text prompt in accordance with one or more embodiments.

For example, FIG. 2 shows the digital analytics visualization system 102 utilizing a dataset of text-visualization structure pairs 200. In one or more embodiments, the "dataset of text-visualization structure pairs" 200 refers to training digital text prompts and ground truth data visualizations (e.g., that correspond to each of the text-visualization structure pairs 200). In particular, the dataset of text-visualization structure pairs 200 includes the digital analytics visualization system 102 populating feature fields of training templates from structural feature tokens of a ground truth data visualization. In some embodiments, the digital analytics visualization system 102 utilizes the dataset of text-visualization structure pairs 200 to fine-tune or train the language machine learning model.

As shown in FIG. 2, the dataset of text-visualization structure pairs 200 includes a digital text prompt 202 and a digital data visualization 204. Further, as shown, the digital text prompt 202 reads "compare pageviews of US." As also shown, the digital data visualization 204 shows two lines on a line graph that compares pageviews in the US for two different websites or sets of websites or applications. Moreover, as shown, from the digital data visualization 204, the digital analytics visualization system 102 extracts a structured output (e.g., a refined visualization token). For instance, the structured output reads "plot: line, metrics: metrics/pageviews, segment: condition (Variables/geocountry, eq, us), numItems: 5, and timeRange: 2023-4-04/2023-05-04, 2023-03-04/2023-04-03." As is described in more detail below, for training, the digital analytics visualization system 102 works backwards to extract the structured output from the digital data visualization 204. As is also described in greater detail below, at inference time, the digital analytics visualization system 102 infers the visualization type, the number of items, and the time range and extracts the metric type and the segment type from the digital text prompt 202.

As shown in FIG. 2, the digital analytics visualization system 102 utilizes the dataset of text-visualization structure pairs 200 to train (e.g., fine-tune) the language machine learning model 206. Additional details of the digital analytics visualization system 102 training the language machine learning model 206 is given below in the description of FIGS. 3 and 4.

As further shown in FIG. 2, the digital analytics visualization system 102, after training the language machine learning model 206, receives a digital text prompt 210 from a client device 208. For instance, the digital text prompt 210 reads "compare our online and in-store revenue." In one or more embodiments, the digital analytics visualization system 102 utilizes the language machine learning model 206 to generate a visualization token prediction and further utilizes a post-processing model (not shown here) to generate a refined visualization token. Moreover, from the refined visualization token prediction, the digital analytics visualization system 102 generates a digital data visualization 212. To illustrate, the digital data visualization 212 reflects the target digital data visualization of the digital text prompt 210 by showing bars to represent the online revenue and a line to represent the in-store revenue.

Figure 3:
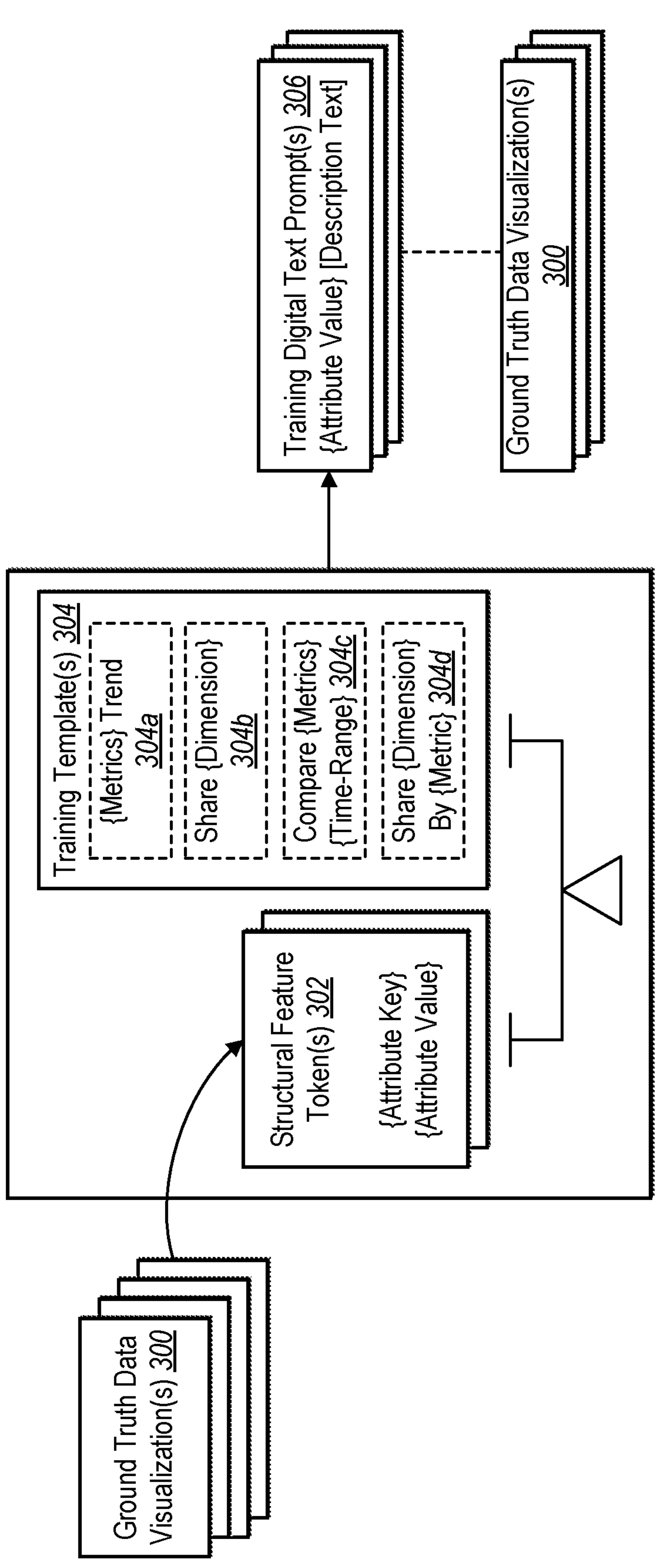
FIG. 3 illustrates a diagram of the digital analytics visualization system generating a dataset of text-visualization structure pairs in accordance with one or more embodiments.

As mentioned above, in one or more implementations, the digital analytics visualization system 102 generates text-visualization structure pairs to train the language machine learning model. As shown in FIG. 3, the digital analytics visualization system 102 generates training digital text prompts from a ground truth data visualization in accordance with one or more embodiments.

As shown in FIG. 3, the digital analytics visualization system 102 utilizes ground truth data visualization(s) 300. In one or more embodiments, the ground truth data visualization(s) 300 refers to one or more data visualizations with known attributes and or structured data. In particular, the digital analytics visualization system 102 utilizes the ground truth data visualization(s) 300 to train the language machine learning model. Further, in some embodiments, the digital analytics visualization system 102 obtains the ground truth data visualization(s) 300 from a repository of previously created digital data visualizations. Moreover, in some embodiments, the digital analytics visualization system 102 obtains the ground truth data visualization(s) 300 from digital text prompts received from client devices and corresponding digital data visualizations (e.g., generated by the digital analytics visualization system 102) selected by the client devices for specific digital text prompts.

As shown, the digital analytics visualization system 102 extracts structural feature token(s) 302 from the ground truth data visualization(s) 300. In other words, the digital analytics visualization system 102 infers a structured output (e.g., a JSON output) from a digital data visualization. In one or more embodiments, the "structural feature token(s)" refer to a structured output that indicates one or more visual elements and/or data attributes. Further, in some embodiments, the structural feature token(s) 302 include an attribute key corresponding to an attribute value. In one or more embodiments, the digital analytics visualization system 102 determines a correspondence between the attribute key of extracted tokens (e.g., structural feature token) and a feature field of a digital text prompt. Moreover, the digital analytics visualization system 102 populates the feature field using the attribute value of the extracted token.

As shown in FIG. 3, in one or more embodiments, the digital analytics visualization system 102 further utilizes training template(s) 304. In one or more embodiments, the training template(s) 304 include a digital text prompt with a feature field. For instance, the training template(s) 304 includes a general digital text prompt for the language machine learning model to learn parameters of text-visualization structure pairs. Further, in some embodiments, the digital analytics visualization system 102 compares the structural feature token(s) 302 with the training template(s) 304 to determine where to populate fields of the training template(s) 304. In other words, the digital analytics visualization system 102 populates feature fields of the training template(s) 304 based on the structural feature token(s) 302 extracted from the ground truth data visualization(s) 300. For instance, the digital analytics visualization system 102 populates the training template(s) with attribute values from the structural feature token(s) 302.

In one or more embodiments, a feature field includes a specific attribute key (e.g., a dimension or a metric) to store information about a particular feature from an analytics database. To illustrate, the training template(s) include a metric feature field, a dimension feature field, a number of items feature field, a time feature field, and a visualization feature field. Additional details related to each of these categories is given below in the description of FIG. 7.

As shown in FIG. 3, the digital analytics visualization system 102 populates the feature fields of the training template(s) 304 to generate the training digital text prompt(s) 306. In one or more embodiments, the training digital text prompt(s) 306 refers to a digital text prompt used for training (e.g., that contains defined attribute values of the structural feature token(s) 302 and description text). Thus, as shown, the digital analytics visualization system 102 generates the dataset of text-visualization structure pairs by generating the training digital text prompt(s) 306 (e.g., by populating feature fields of the training template(s) 304 with the attribute values from the structural feature token(s) 302) and further identifying the ground truth data visualization(s) 300 that correspond with each of the training digital text prompt(s) 306 (e.g., by identifying the visualization that was used to populate the training template(s) 304).

As shown in FIG. 3, the training template(s) 304 contain different variations of training templates 340*a*-304*d*. For instance, FIG. 3 shows {metrics} trend, share {dimension}, compare {metrics} {time-range}, and share {dimension} by {metric} (where {______} indicates a field ready to populate with a particular attribute value corresponding to the identified attribute key). For instance, the training template(s) 304 contain a first feature field of {metrics} and a first description text of trend. Moreover, in some embodiments, the digital analytics visualization system 102 further obtains a second training template with a second feature field of {dimension} and a second description text show. Moreover, in some embodiments, the digital analytics visualization system 102 populates the first feature field of {metrics} with "visits" based on the structural feature token(s) 302 and populates the second feature field of {dimension} with "country" based on an additional structural feature token. To further illustrate, the below table provides additional examples of the training template(s) 304, the structural feature token(s) 302, and the training digital text prompt(s) 306.

| Structural Feature Token(s) 302 | Training Template(s) 304 | Training Digital Text Prompt(s) 306 |
|---|---|---|
| {plot: line, metrics: visits, dimension: "", timeRange: "" numItems: "", comparison: false} | {metrics} trend | Visits trend |
| {plot: bar, metrics: visits, dimension: country, timeRange: "", numItems: 10, comparison: false} | Show {dimension} | Compare country |
| {plot: line, metrics: revenue, dimension: "", timeRange: thismonth, numItems: "", comparison: true | Compare {metrics} {time_range} | Compare revenue this month |
| {plot: bar, metrics: visits, dimension: country, timeRange: "", numItems: 10, comparison: false} | Show {dimension} by {metrics} | Show country by visits |
| {plot: summary, metrics: visits, dimension: country, timeRange: "", numItems: 1, comparison: false} | What are the {dimension} with largest {metrics} | What is the country with largest visits |
| {plot: donut, metrics: revenue, dimension: country, timeRange: "", numItems: 10, comparison: false} | Distribution of {metrics} by {dimension} | Distribution of revenue by country |

To illustrate, the above table shows the structural feature token(s) 302 extracted from the ground truth data visualization(s) 300, for which the digital analytics visualization system 102 uses to populate the feature fields of the training template(s) 304. For instance, the digital analytics visualization system 102 populates the feature field of the training template {metrics} trend with "visits." In other words, {metrics} is the feature field of the training template and the structural feature token corresponding with the training template indicates that the attribute value for {metrics} is "visits." Accordingly, from populating the feature field of the training template, the digital analytics visualization system 102 generates the training digital text prompt of "visits trend."

Figure 4:
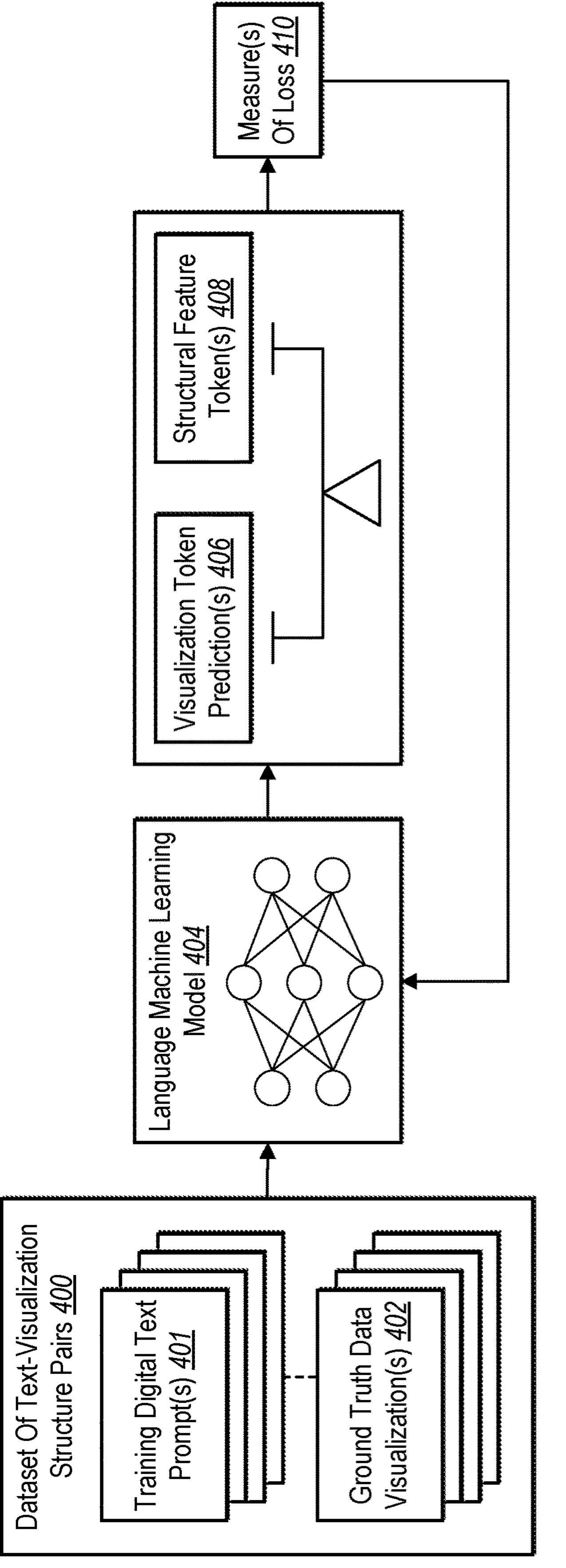
FIG. 4 illustrates a diagram of the digital analytics visualization system comparing visualization token prediction(s) to structural feature token(s) to determine a measure of loss in accordance with one or more embodiments.

As mentioned above, in one or more implementations, the digital analytics visualization system 102 modifies parameters of the language machine learning model. FIG. 4 shows the digital analytics visualization system 102 comparing visualization token prediction(s) to structural feature token(s) to determine a measure of loss in accordance with one or more embodiments. In one more implementations, the digital analytics visualization system fine-tunes a pre-trained language machine learning model (e.g., a large language model trained to generate text from input prompts from a large corpus of text data).

As shown in FIG. 4, the digital analytics visualization system 102 utilizes a dataset of text-visualization structure pairs 400 that contains training digital text prompt(s) 401 and ground truth data visualization(s) 402. As shown, the digital analytics visualization system 102 trains a language machine learning model 404 by showing the language machine learning model 404 hundreds to thousands of examples (e.g., training data) and optimizes the language machine learning model with specifically tailored training data. For instance, the training performed by the digital analytics visualization system 102 includes fine-tuning parameters of the language machine learning model 404 to optimize the specific task of generating digital data visualizations from digital text prompts.

As mentioned previously, the digital analytics visualization system 102 can utilize a variety of architectures in training and implementing a language machine learning model utilizing the dataset of text-visualization structure pairs 400. To illustrate, in some embodiments, the digital analytics visualization system 102 fine-tunes a flanT5 as the language machine learning model 404. Specific details of curating various forms of training data to fine-tune the language machine learning model 404 is given below in the description of FIG. 5.

For example, the digital analytics visualization system 102 utilizes a language machine learning model 404 to generate visualization token prediction(s) 406 from the training digital text prompt(s) 401. Moreover, as shown, the digital analytics visualization system 102 compares the visualization token prediction(s) 406 to structural feature token(s) 408 (e.g., structural feature token(s) extracted from the ground truth data visualization(s) 402).

As shown in FIG. 4, from comparing the visualization token prediction(s) 406 with the structural feature token(s) 408, the digital analytics visualization system 102 determines or generates measure(s) of loss 410. The digital analytics visualization system 102 can utilize a variety of loss functions to generate measure of loss 410, including mean squared error loss, mean absolute error loss, Huber loss, binary cross-entropy loss, categorical cross-entropy loss, spare categorical cross-entropy loss, hinge loss, Kullback-Leibler divergence loss, and cosine similarity loss. Further, as shown, the digital analytics visualization system 102 utilizes the measure(s) of loss 410 to modify parameters of the language machine learning model 404 (e.g., utilizing back propagation and/or gradient descent).

Figure 5:
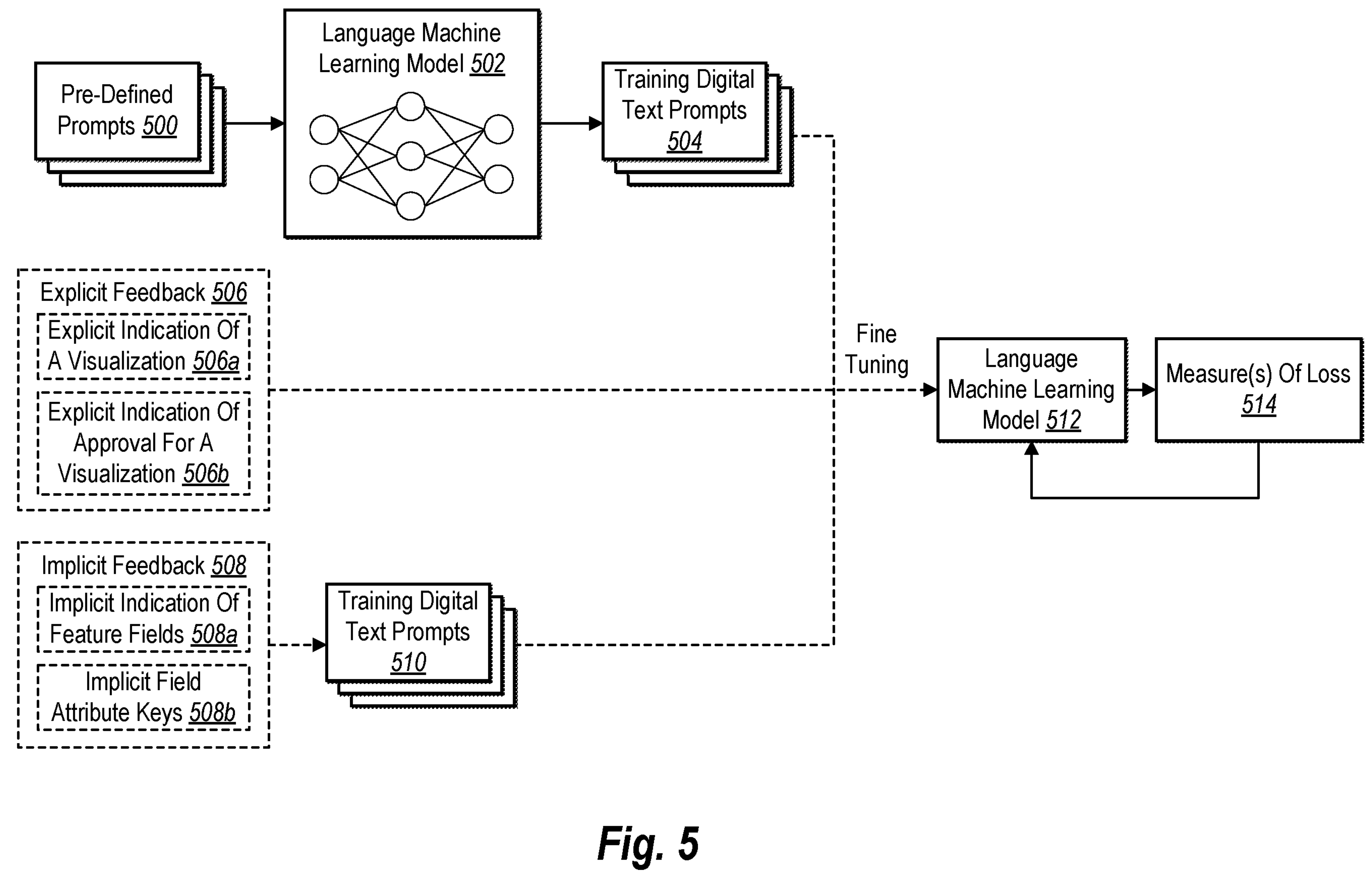
FIG. 5 illustrates a diagram of the digital analytics visualization system modifying parameters of a language machine learning in accordance with one or more embodiments.

As mentioned above, in one or more implementations, the digital analytics visualization system 102 curates different forms of training data to fine-tune a language machine learning model. FIG. 5 illustrates, the digital analytics visualization system 102 modifying parameters of a language machine learning model from various forms of data in accordance with one or more embodiments. For example, the digital analytics visualization system 102 curates training data to fine-tune a language machine learning model to generate accurate digital data visualizations within a digital analytics framework (e.g., captured digital events). In other words, the digital analytics visualization system 102 continually updates and modifies the language machine learning model 512 (e.g., even during or after inference time of the language machine learning model 512).

As shown in FIG. 5, the digital analytics visualization system 102 utilizes pre-defined prompts 500. For instance, the digital analytics visualization system 102 receives the pre-defined prompts 500 (e.g., defined or provided by an administrator device). As shown, the digital analytics visualization system 102 utilizes a language machine learning model 502 to process the pre-defined prompts 500 to generate training digital text prompts 504. For instance, the digital analytics visualization system 102 utilizes a language machine learning model 512 to generate visualization token predictions from the training digital text prompts 504 and further determines measure(s) of loss 514.

As also shown in FIG. 5, in one or more embodiments, the digital analytics visualization system 102 utilizes explicit feedback 506 that includes an explicit indication of a visualization 506*a* and/or an explicit indication of approval for a visualization 506*b*. In one or more embodiments, the explicit indication of a visualization 506*a* refers to a digital text prompt submitted by a client device that expressly indicates a visualization. For instance, the digital text prompt submitted by the user expressly indicates "create a line chart of X and Y." In such cases, the "line chart" is the explicit indication of a visualization 506*a*.

In one or more embodiments, the explicit indication of approval for a visualization 506*b* refers to a digital text prompt submitted by a user for which the digital analytics visualization system 102 subsequently generates a digital data visualization. In some embodiments, the digital analytics visualization system 102 provides an option for a user to provide feedback for the generated digital data visualization. In some instances, the feedback includes the user expressly indicating approval or disapproval of the digital data visualization. Further, in some instances, the digital analytics visualization system 102 generates a set of digital data visualizations in response to a digital text prompt and the feedback includes the user selecting one of the set of digital data visualizations. In such instances, the digital analytics visualization system 102 takes the user selecting the digital data visualization as the explicit indication of approval for a visualization 506*b*.

Specifically, the digital analytics visualization system 102 takes the explicit feedback 506 and utilizes it to fine-tune the language machine learning model 512. For instance, the digital analytics visualization system 102 modifies parameters of the language machine learning model 512 based on the explicit feedback 506 (e.g., digital text prompt X and digital data visualization Y received explicit approval from user X, or digital text prompt A contains an explicit indication of digital data visualization Z).

As also shown in FIG. 5, in one or more embodiments, the digital analytics visualization system 102 utilizes implicit feedback 508 that includes an implicit indication of feature fields 508*a* and implicit field attribute keys 508*b*. In one or more embodiments, the implicit indication of feature fields 508*a* refers to leveraging the digital text prompt utilized by a client device to generate a digital data visualization. For instance, if a user utilized a digital text prompt that recites "distribution" and the user picks a donut chart, the digital analytics visualization system 102 implies that "distribution" refers to a donut chart. As such, the digital analytics visualization system 102 generates training digital text prompts 510 from the implicit indication of feature fields 508*a*.

Further, in one or more embodiments, the implicit field attribute keys 508*b* includes the digital analytics visualization system 102 identifying data attributes utilized within the digital text prompt. For instance, a client device may receive user input of "compare pageviews and revenue for May" where the digital analytics visualization system 102 identifies both the pageviews and revenue as quantitative attributes. In such cases, the digital analytics visualization system 102 extracts a high-level training template as "Compare [QUANT_ATTR] and [QUANT_ATTR] for [TIME]. Moreover, in some embodiments, the digital analytics visualization system 102 utilizes the high-level training template to generate the training digital text prompts 510 with the methods and processes discussed above in FIGS. 2 and 3. Similar to the explicit feedback 506, the digital analytics visualization system 102 also utilizes the training digital text prompts 510 generated from the implicit feedback 508 to further determine the measure(s) of loss 514 (e.g., by generating visualization token predictions and comparing them with the structural feature tokens) and modify parameters of the language machine learning model 512.

Figure 6:
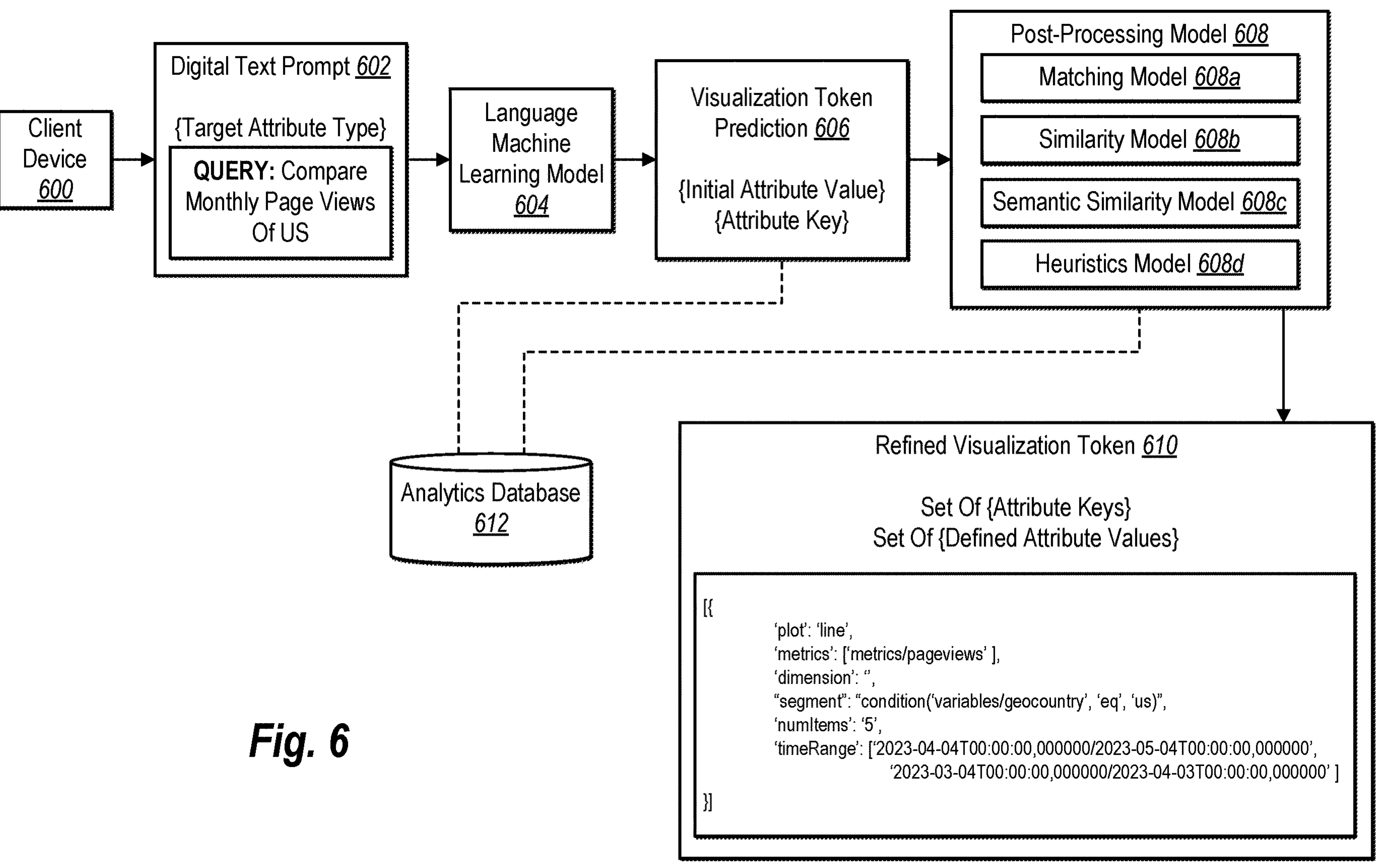
FIG. 6 illustrates an overview of the digital analytics visualization system generating a refined visualization token in accordance with one or more embodiments.

As mentioned above, the digital analytics visualization system 102 generates a refined visualization token. FIG. 6 illustrates an overview of the digital analytics visualization system 102 generating a refined visualization token from modifying a visualization token prediction with a post-processing model in accordance with one or more embodiments.

For example, FIG. 6 shows the digital analytics visualization system 102 receiving a digital text prompt 602 from a client device 600. As mentioned above, the digital text prompt 602 includes a target digital data visualization description with a target attribute type. In one or more embodiments "a target digital data visualization description" includes an express or implicit description within the digital text prompt 602 to generate a specific type of digital data visualization. For instance, the term 'compare x and y' indicates that the target digital data visualization description includes a plot with two separate lines to compare x and y. In some instances, the term "show me top X" indicates that the target digital data visualization description includes a bar graph plot to show the top categories (e.g., 'X'). Moreover, in some instances, the digital text prompt 602 includes an express indication such as "compare x and y using a line plot." In some embodiments, the express use of the term "line plot" indicates to the digital analytics visualization system 102 that lines plots are the target digital data visualization description.

In one or more embodiments, "a target attribute type" includes a feature, characteristic, or attribute of a desired digital visualization. For instance, a target attribute type includes a word or term describing a feature class or characteristics within the digital text prompt 602. In some instances, the target attribute type includes a client device using a different word or term relative to a schema or attribute of an analytics database. In other words, in some cases, the digital text prompt 602 includes the word "sales" as the target attribute type, however the attribute type within the analytics database is actually "revenue."

In one or more embodiments, the target digital data visualization description includes multiple target attribute types. For example, the target digital data visualization description includes a first target attribute type of purchases and a second target attribute type of page views, where the analytics database contains the first target attribute type as "add to cart" and the second attribute type as "webviews."

As shown in FIG. 6, the digital analytics visualization system 102 utilizes a language machine learning model 604 to generate a visualization token prediction 606 from a digital text prompt 602. As shown in FIG. 6, the visualization token prediction 606 includes an initial attribute value, an attribute key. In some embodiments, the digital analytics visualization system 102 extracts the initial attribute value and the attribute key from the digital text prompt (e.g., the description text of the digital text prompt). As also shown, the visualization token prediction contains an attribute key that corresponds to an analytics database 612. In other words, the language machine learning model generates the visualization token prediction 606 (e.g., from the digital text prompt 602 that reads "compare monthly page views of US") by extracting an attribute value of "page views" and replacing it with the attribute value {metrics/pageviews}, which corresponds with the analytics database 612.

Further, in one or more embodiments, the digital analytics visualization system 102 extracts a first attribute value (e.g., page views) for a first attribute key (e.g., metric key) that corresponds to the analytics database from a first target attribute type (e.g., page views, which is pageviews in the analytics database) of the target digital data visualization description (e.g., a comparison). Moreover, in some embodiments, the digital analytics visualization system 102 extracts a second attribute value (e.g., US) for a second attribute key (e.g., dimension key) corresponding to the analytics database from the second target attribute type (e.g., US, which is U.S.A. in the analytics database) of the target digital data visualization description (e.g., a comparison).

As also shown in FIG. 6, the digital analytics visualization system 102 utilizes a post-processing model 608 to refine the visualization token prediction 606 to replace/match the initial attribute value with the analytics database 612. As also shown, the post-processing model 608 includes a matching model 608*a*, a similarity model 608*b*, a semantic similarity model 608*c*, and a heuristics model 608*d*. Specific details of each of the models shown in the post-processing model 608 are given below in the description of FIG. 8.

As shown in FIG. 6, the digital analytics visualization system 102 generates a refined visualization token 610 from the visualization token prediction 606 by using the post-processing model 608. As shown, the refined visualization token 610 includes a set of defined attribute values (e.g., defined from the analytics database 612). In one or more embodiments, the digital analytics visualization system 102 stores the set of defined attribute values within the analytics database 612. For example, the set of defined attribute values includes specific values associated with attribute keys that represent different aspects of information. For instance, like the attribute values described above, the set of defined attribute values refers to attribute values defined within the analytics database.

Although not shown in FIG. 6, in one or more embodiments, the digital analytics visualization system 102 receives a digital text prompt and utilizes a paraphrasing model to rephrase the digital text prompt. For instance, the digital analytics visualization system 102 determines to utilize the paraphrasing model when the digital text prompt satisfies a prompt length threshold. Thus, when the digital text prompt exceeds a certain number of words, the digital analytics visualization system 102 utilizes the paraphrasing model to shorten the digital text prompt. Moreover, in some embodiments, the digital analytics visualization system 102 utilizes the paraphrasing model to shorten words such as by transforming plural words to singular words. Furthermore, in some embodiments, the digital analytics visualization system 102 utilizes the paraphrasing model to identify synonyms within the digital text prompt.

The digital analytics visualization system 102 can utilize a variety of different paraphrasing models. In one or more embodiments, the digital analytics visualization system 102 trains the paraphrasing model on a dataset of sentence pairs, the sentence pair includes a sentence and a paraphrased version of the sentence. For example, the digital analytics visualization system 102 utilizes recurrent neural networks, long short-term memory networks, or transformer models as the paraphrasing model. Further, in some embodiments, the digital analytics visualization system 102 utilizes the trained paraphrasing model to generate embeddings of words or sub word units within a digital text prompt (e.g., a sentence). Moreover, in some embodiments, the digital analytics visualization system 102 utilizes attention mechanisms to focus on different parts of the generated word embeddings (e.g., places different weights on different word embeddings) and further decodes the word embeddings to generate a new sequence of words (e.g., generates a paraphrased digital text prompt).

Figure 7:
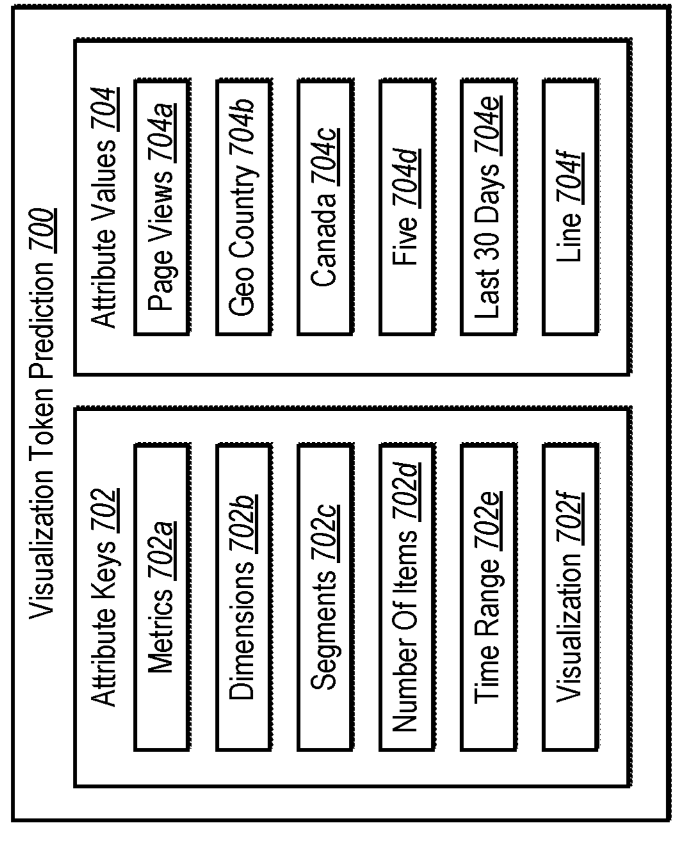
FIG. 7 illustrates a diagram of the digital analytics visualization system generating a visualization token prediction that includes attribute keys and attribute values in accordance with one or more embodiments.

As mentioned, the visualization token prediction contains various types of attribute keys and attribute values. FIG. 7 illustrates the digital analytics visualization system 102 generating a visualization token prediction that includes attribute keys and attribute values in accordance with one or more embodiments.

For example, FIG. 7 shows a visualization token prediction 700 with attribute keys 702 and attribute values 704. For instance, the attribute keys 702 shows metrics 702*a*. In one or more embodiments, the metrics 702*a* include a quantifiable attribute or characteristic (e.g., a numerical value). For example, the digital analytics visualization system 102 utilizes the metrics 702*a* in tandem with the dimension to provide evaluation and comparison between different dimensions. To illustrate, the metrics 702*a* include numerical properties such as page views, unique visitors, bounce rate, conversion rate, add to cart percentage, feedback scores, shares, comments, and clicks. Further, the metrics 702*a* vary between different analytics databases. As shown in FIG. 7, a corresponding attribute value for the metrics 702*a* is shown as page views 704*a* (e.g., a number of requests to load a single page on a website or application, such as when a user sends a request to retrieve the contents of a specific website or application).

In one or more embodiments, the dimensions 702*b* includes a qualitative attribute, classification, or characteristic to categorize digital events. For example, the dimensions 702*b* break down digital analytics data (e.g., digital events) into different category types. For instance, the digital analytics visualization system 102 breaks down digital analytics data by different dimensions to generate digital data visualizations that describe variations within a digital analytics dataset. To illustrate, the dimensions 702*b* include properties not inherently numerical such as geographic location, time periods, product categories (e.g., clothes, shoes, books, computers, etc.), user groups, and demographics (e.g., gender, age, income level). Accordingly, the dimensions 702*b* for a first customer or organization specific database (e.g., a first digital analytics dataset) varies drastically from a second customer or organization specific database (e.g., due to different categorical requirements related to their digital events). As shown in FIG. 7, a corresponding attribute value for the dimensions 702*b* is shown as geo country 704*b* (e.g., a geographic location or country of a user who performs digital events corresponding to a website or application).

In one or more embodiments, the digital analytics visualization system 102 treats segment(s) as a sub-category of the dimensions 702*b*. For example, the segments 702*c* include a subset of a larger dataset or population group that share common characteristics. Further, the digital analytics visualization system 102 utilizes the segments 702*c* to subdivide a broad category into more similar (e.g., homogenous) groups. For instance, the digital analytics visualization system 102 defines the segments 702*c* based on demographic factors (gender, age, income), behavioral factors (first-time, frequent), and geographic factors (urban, suburban, rural). Further, for a geo-variable country (e.g., the United States), the segments 702*c* further subdivides the geo-variable country into suburban, urban, or rural. As shown in FIG. 7, a corresponding attribute value for the segments 702*c* is shown as Canada 704*c*.

In one or more embodiments, a number of items 702*d* includes a quantifier for the number of individual elements within the analytics database (e.g., a customer or organization specific database). For example, the number of items 702*d* indicates the size or volume of the data being used for the digital data visualization. For instance, for a digital text prompt that includes comparing monthly visits and page views by country, the digital analytics visualization system 102 determines a number of items that reasonably fits the request. To illustrate, the digital analytics visualization system 102 determines the number of items 702*d* as five, which means the digital analytics visualization system 102 generates the digital data visualization that includes a monthly comparison for visits and page views for the last five months. As shown in FIG. 7, a corresponding attribute value for the number of items 702*d* is shown as five 704*d*.

In one or more embodiments, a time range 702*e* is a sub-category of a dimension. For example, the time range 702*e* acts as a way to categorize digital data based on temporal attributes. For instance, the time range 702*e* includes categorizing digital data based on date, month, year, hour, seconds, etc. Further, the time range 702*e* includes comparing the first month of every year for the last ten years. Accordingly, the digital analytics visualization system 102 utilizes the time range 702*e* to generate digital data visualizations (which allows a user of a client device to evaluate different patterns of digital events between different time ranges). As shown in FIG. 7, a corresponding attribute value for the time range 702*e* is shown as last 30 days 704*e*.

In one or more embodiments, a visualization 702*f* includes a data visualization that represents different types of data. For example, the visualization 702*f* includes a line plot, a bar chart, a histogram, a pie chart, a scatter plot, a box plot, a heat map, a donut chart, a bubble chart, and a network graph. As shown in FIG. 7, a corresponding attribute value for the visualization 702*f* is shown as line 704*f*.

Although FIG. 7 shows a set number of the attribute keys 702 and the attribute values 704, in one or more embodiments, the digital analytics visualization system 102 utilizes a variety of different additional or different attribute keys and attribute values and/or removes any one of the attribute keys 702 or the attribute values 704.

Figure 8:
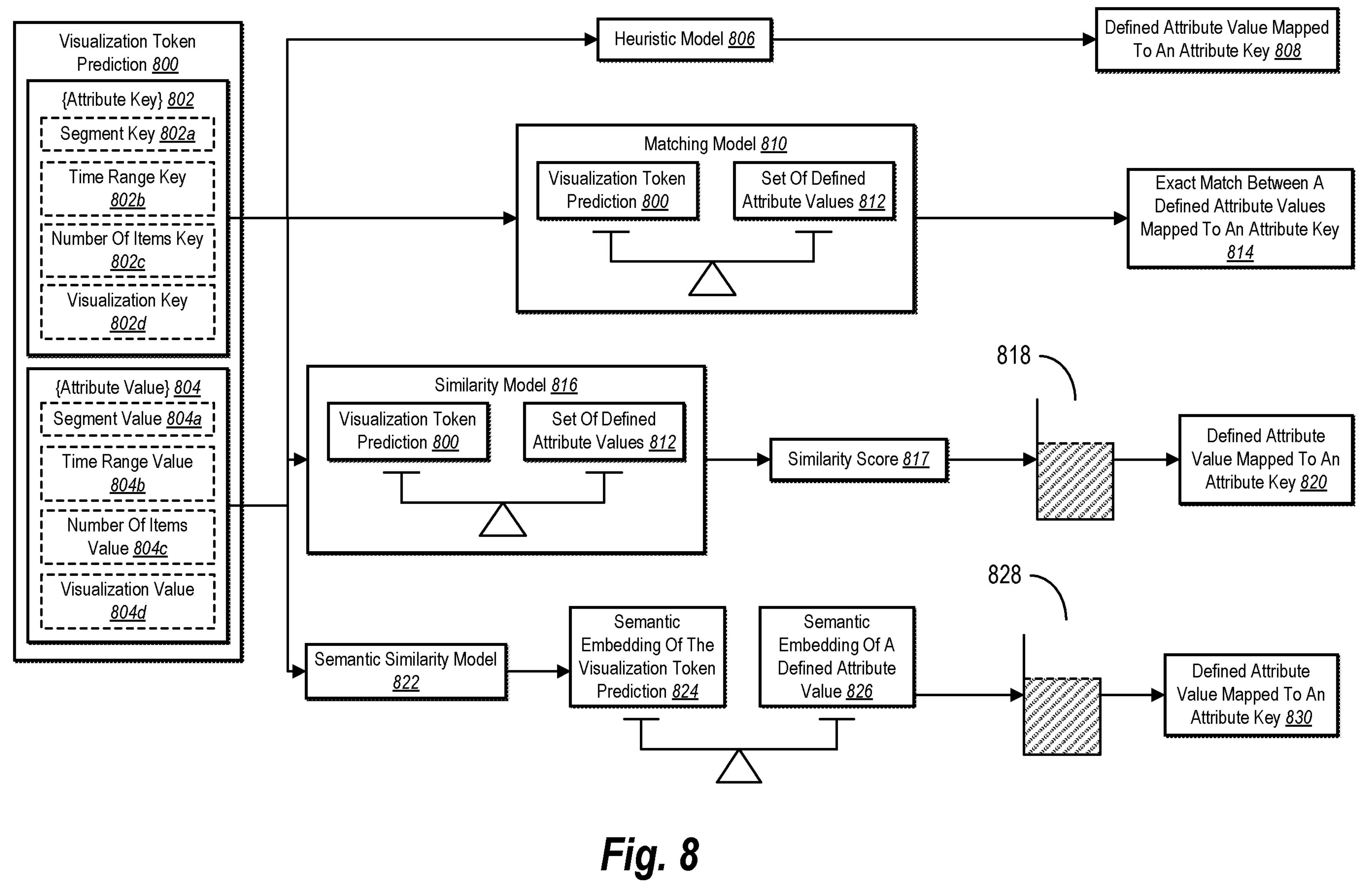
FIG. 8 illustrates a diagram of the digital analytics visualization system utilizing a variety of models as part of the post-processing model to generate a defined attribute value mapped to an attribute key in accordance with one or more embodiments.

As mentioned above, the digital analytics visualization system 102 utilizes the post-processing model to generate refined visualization tokens. FIG. 8 illustrates the digital analytics visualization system 102 utilizing a variety of models as part of the post-processing model to generate a defined attribute value mapped to an attribute key in accordance with one or more embodiments.

As shown in FIG. 8, the digital analytics visualization system 102 generates a visualization token prediction 800 utilizing a language machine learning model. As shown, the visualization token prediction 800 includes an attribute key 802 and an attribute value 804. For instance, as discussed above, the language machine learning model generates the visualization token prediction 800 that include at least one of a segment key 802*a*, a time range key 802*b*, a number of items key 802*c*, and a visualization key 802*d*. Further, in some embodiments, the visualization token prediction 800 also includes at least one of a segment value 804*a*, a time range value 804*b*, a number of items value 804*c*, and a visualization value 804*d*. Moreover, the visualization token prediction 800 includes description text.

As mentioned above, and as shown in FIG. 8, the digital analytics visualization system 102 utilizes the post-processing models to refine the visualization token prediction 800. In addition, in some embodiments, the digital analytics visualization system 102 further provides a digital text prompt (e.g., utilized to generate the visualization token prediction 800) to the post-processing models. In other words, the post-processing models account for the description text of the digital text prompt to refine the visualization token prediction 800.

Moreover, in one or more embodiments, the digital analytics visualization system 102 utilizes the post-processing models to replace the attribute key 802 and/or the attribute value 804. In other words, the digital analytics visualization system 102 replaces the attribute key 802 and/or the attribute value 804 to match the attribute key or the attribute value within the analytics database (e.g., customer or organization specific database).

As shown in FIG. 8, in one or more embodiments, the digital analytics visualization system 102 utilizes a heuristic model 806 to map various initial attribute values (e.g., predictions) to defined attribute values. For instance, the heuristic model 806 contains mappings between specific attribute value predictions (e.g., initially outputted from the language machine learning model) and defined attribute values within an analytics database. To illustrate, for a number of items value, the digital analytics visualization system 102 establishes a different number of items for different dimensions (e.g., for countries, the number of items could be five, for products, the number of items could be ten). To further illustrate, for the time range value, the digital analytics visualization system 102 establishes a default time range of the current month versus the previous month. As shown, the digital analytics visualization system 102 utilizes the heuristic model 806 to map a defined attribute value 808 to an attribute key.

In other words, in some embodiments, the digital analytics visualization system 102 establishes a list of predefined heuristics for a number of items value, a time range value, and a visualization value. For instance, the list of predefined heuristics includes a number of items of five for a comparison between different countries and a number of items of ten for top pages. Further, in some embodiments, the list of predefined heuristics includes a donut visualization, if the description text includes the word "distribution" and a line visualization, if the description text includes the word "compare." Moreover, in some embodiments, the list of predefined heuristics includes a bar plot visualization, if the visualization token prediction 800 contains show {metrics} by {dimension}. Additionally, in some embodiments, the list of predefined heuristics includes a time range of the current month versus the previous month, if the description text includes the word "compare."

Further, in one or more embodiments, the digital analytics visualization system 102 utilizes the heuristic model 806 to generate precise time ranges from the visualization token prediction 800. For instance, the digital analytics visualization system 102 via the heuristic model 806 utilizes a list of temporal tokens that convert the visualization token prediction 800 into a date-time format. For instance, the digital analytics visualization system 102 via the heuristic model 806 references the temporal token list for tokens such as "thismonth," "pastyear," "twoweeksago," to convert them to the appropriate date-time format. To illustrate, for "thismonth" the temporal token list includes an API call to fetch the current date.

As further shown in FIG. 8, the digital analytics visualization system 102 also utilizes a matching model 810. For instance, the digital analytics visualization system 102 determines a match by comparing the visualization token prediction 800 with a set of defined attribute values 812. For example, in some instances, the digital analytics visualization system 102 utilizes a hash table to check a match between the visualization token prediction 800 and the set of defined attribute values 812. To illustrate, the digital analytics visualization system 102 hashes the set of defined attribute values (within the analytics database) and also hashes the visualization token prediction 800 (e.g., generating, using a hash function, a hash key for each of the defined attribute values and the visualization token prediction). Further, in some embodiments, if the digital analytics visualization system 102 finds an exact match between the visualization token prediction 800 and a defined attribute value, then the digital analytics visualization system 102 matches 814 the defined attribute value to the attribute key of the visualization token prediction 800.

As also shown in FIG. 8, the digital analytics visualization system 102 utilizes a similarity model 816 to determine a similarity score between the visualization token predictions 800 and a set of defined attribute values 812 corresponding to the attribute key. For example, the similarity model 816 measures a degree of closeness between two strings of characters. In some embodiments, the digital analytics visualization system 102 utilizes the similarity model 816 to determine an edit distance by calculating the minimum number of single-character edits required to transform one string into another string. In such cases, the smaller the distance, the more similar the strings. In some embodiments, the digital analytics visualization system 102 utilizes an n-gram comparison (e.g., a comparison of substrings with a length of n). Further, in some embodiments, the disclosed system utilizes a cosine similarity measure to determine the cosine angle between two vectors. To do so, the digital analytics visualization system 102 represents each string as a vector, and the cosine of the angle between the vectors is the measure of similarity.

In one or more embodiments, the matching model 810 fails to find a match between the visualization token prediction 800 and the set of defined attribute values 812. In some embodiments, in response to the failure to find a match, the digital analytics visualization system 102 utilizes another model. As shown, by using the similarity model 816, the digital analytics visualization system 102 generates a similarity score 817, and from the similarity score 817, the digital analytics visualization system 102 utilizes a similarity score threshold 818 to determine the most similar attribute value for the visualization token prediction 800. In one or more embodiments, the digital analytics visualization system 102 allows a user to indicate a threshold level of similarity. In response to the indication of the threshold level of similarity, the digital analytics visualization system 102 establishes the similarity score threshold 818. As shown, in response to finding an attribute value that satisfies the similarity score threshold 818, the digital analytics visualization system 102 maps a defined attribute value 820 to an attribute key.

In one or more embodiments, the similarity model 816 fails to find an attribute value from the set of defined attribute values 812 that satisfies the similarity score threshold 818. In some embodiments, in response to the failure to find an attribute value that satisfies the similarity score threshold 818, the digital analytics visualization system 102 utilizes a semantic similarity model 822. In one or more embodiments, the digital analytics visualization system 102 utilizes the semantic similarity model 822 to determine a semantic similarity between visualization token predictions and a set of defined attribute values corresponding to the attribute key. For example, the digital analytics visualization system 102 utilizes the semantic similarity model 822 to generate embeddings (e.g., vector representations) of words or sentences in a vector space.

As shown, the digital analytics visualization system 102 generates a semantic embedding 824 of the visualization token prediction, and a semantic embedding 826 of a set of defined attribute values (e.g., the semantic embedding allows the digital analytics visualization system 102 to quantify the similarity between pieces of text in a way that more closely aligns with a human understanding of text meanings). Furthermore, the digital analytics visualization system 102 compares the embedding representations between the set of defined attribute values corresponding to the attribute key and the visualization token predictions in a latent vector space.

Moreover, like the similarity score threshold 818, the digital analytics visualization system 102 also utilizes a semantic similarity threshold 828. In such cases, the digital analytics visualization system 102 predetermines a cut-off point for a first embedding to be similar to a second embedding. Further, in response to finding an attribute value that satisfies a semantic similarity threshold 828, the digital analytics visualization system 102 maps a defined attribute value 830 to an attribute key.

To illustrate the differences between a target attribute type utilized in a digital text prompt and an actual attribute type in an analytics database, in some embodiments, the digital text prompt reads "show marketing channels by orders." In some embodiments, "marketing channel" and "orders" correspond to "variables/_experience.analytics.customDimensions.eVars.eVar1" and "metrics/commerce.purchases.value_1" respectively. In such circumstances, the digital analytics visualization system 102 first utilizes the matching model 810, then utilizes the similarity model 816 (if no match is found), and then utilizes the semantic similarity model 822 (if no attribute value satisfies the similarity score threshold). Thus, the digital analytics visualization system 102 iterates through the models shown in FIG. 8 to map a defined attribute value to an attribute key.

Although not shown in FIG. 8, in one or more embodiments, the digital analytics visualization system 102 takes n-grams (e.g., a sequence of items (words) from a sample of text) of the attribute keys in the visualization token prediction 800 to match the attribute key with a defined attribute value. For instance, for a digital text prompt of "share of revenue by sessions," the digital analytics visualization system 102 via the language machine learning model mistakes "share of Revenue" as a metric key (e.g., the attribute key 802). Further, "share of" adds noise when matching based on string similarity or semantic similarity. By deriving the n-grams, the digital analytics visualization system 102 avoids problems of added noise by matching a 1-gram with another 1-gram.

Furthermore, in one or more embodiments, the visualization token prediction 800 contains the attribute key 802 that fails to match the attribute key within the analytics database. For instance, if the digital analytics visualization system 102 identifies the attribute key 802 in the visualization token prediction 800 as "dimension" but the attribute key in the analytics database is "attribute," the digital analytics visualization system 102 utilizes the post-processing models to change the attribute key 802 from dimension to attribute.

Furthermore, in one or more embodiments, the digital analytics visualization system 102 mistakes a metric for a dimension or vice-versa in the visualization token prediction 800. In some embodiments, the digital analytics visualization system 102 ignores the attribute key within the visualization token prediction 800 (e.g., as predicted by the language machine learning model) and reclassifies the attribute keys in the visualization token prediction 800.

Figure 9:
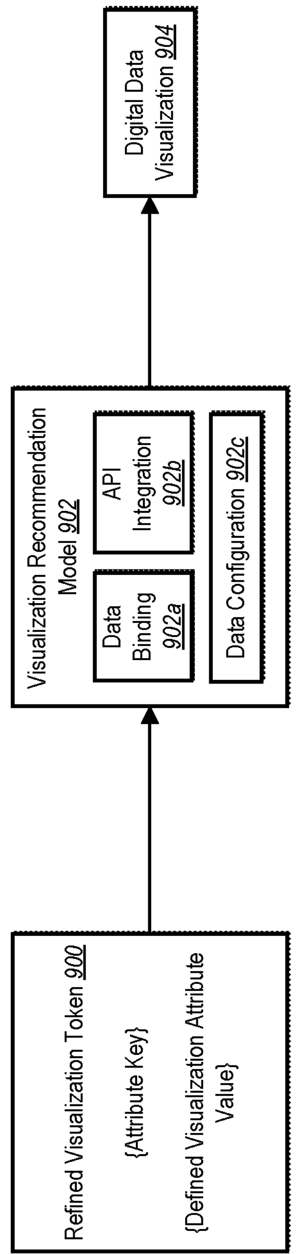
FIG. 9 illustrates a diagram of the digital analytics visualization system utilizing a visualization recommendation model to build a digital data visualization in accordance with one or more embodiments.

As mentioned above, the digital analytics visualization system 102 builds a digital data visualization from a refined visualization token. FIG. 9 illustrates the digital analytics visualization system 102 utilizing a visualization recommendation model to build a digital data visualization in accordance with one or more embodiments.

As shown in FIG. 9, the digital analytics visualization system 102 generates a refined visualization token 900 that includes an attribute key and a defined visualization attribute value. As shown, the digital analytics visualization system 102 utilizes a visualization recommendation model 902 to generate a digital data visualization 904. For instance, the digital analytics visualization system 102 utilizes the visualization recommendation model 902 to process the attribute key and the defined attribute value to determine one or more digital data visualizations. In particular, the digital analytics visualization system 102 utilizes the visualization recommendation model 902 to identify specific attribute keys that indicate specific visualizations. Moreover, in some instances the disclosed system identifies specific attribute values that indicate specific visualizations. Furthermore, in some instances, the digital analytics visualization system 102 identifies the aspects of the description text that indicate specific digital data visualizations.

As shown in FIG. 9, the visualization recommendation model 902 shows the visualization recommendation model 902 includes data binding 902*a*, API integration 902*b*, and data configuration 902*c*. For instance, if the digital analytics visualization system 102 utilizes data binding 902*a* to build the digital data visualization 904, the digital analytics visualization system 102 provides to a model (e.g., such as Vega-Lite), the type of plot and additional visualization attributes (e.g., color). Further, the digital analytics visualization system 102 via the Vega-Lite model binds the data to visual elements within a chart (e.g., binds the data to document object model elements (DOM)). In other words, the refined visualization token 900 acts as a high-level declarative syntax for the visualization recommendation model 902 via the data binding 902*a* to build the digital data visualization 904.

Further, in one or more embodiments, the digital analytics visualization system 102 utilizes the application programming interface (API) integration 902*b*. For instance, the API integration 902*b* fetches data fields from the refined visualization token 900 and inserts the fetched data fields into a visualization application. In some embodiments, inserting the fetched data fields populates the relevant portions from the refined visualization token 900 to create the digital data visualization 904. Moreover, in one or more embodiments, the digital analytics visualization system 102 utilizes a data configuration 902*c*. For instance, the data configuration 902*c* includes passing fields of the refined visualization token 900 as parameters to a visualization library application (e.g., chart.JS library). Further, the data configuration 902*c* builds the digital data visualization 904 from the fields of the refined visualization token 900 using operations within the visualization library application.

Although not shown in FIG. 9, in one or more embodiments, the digital analytics visualization system 102 generates a set of digital data visualizations (e.g., rather than just a single digital data visualization). For instance, the digital analytics visualization system 102 outputs the top five or top ten visualizations to the user by taking the top-K attributes (e.g., top similarity scores or semantic embedding similarity scores for visualizations that correspond with the visualization token prediction) closest in a low-dimensional embedding space to the attribute in the initial visualization token prediction. In other words, using the similarity model or the semantic similarity model, the digital analytics visualization system 102 determines the top visualization values (e.g., closest to the initial visualization value of the visualization token prediction).

In one or more embodiments, the digital analytics visualization system 102 provides a set of digital data visualizations and allows a user to select one or more of the set of digital data visualizations. Further, in some embodiments, a selection of one or more digital data visualizations acts as explicit feedback to the digital analytics visualization system 102 to modify parameters of the language machine learning model.

Figure 10:
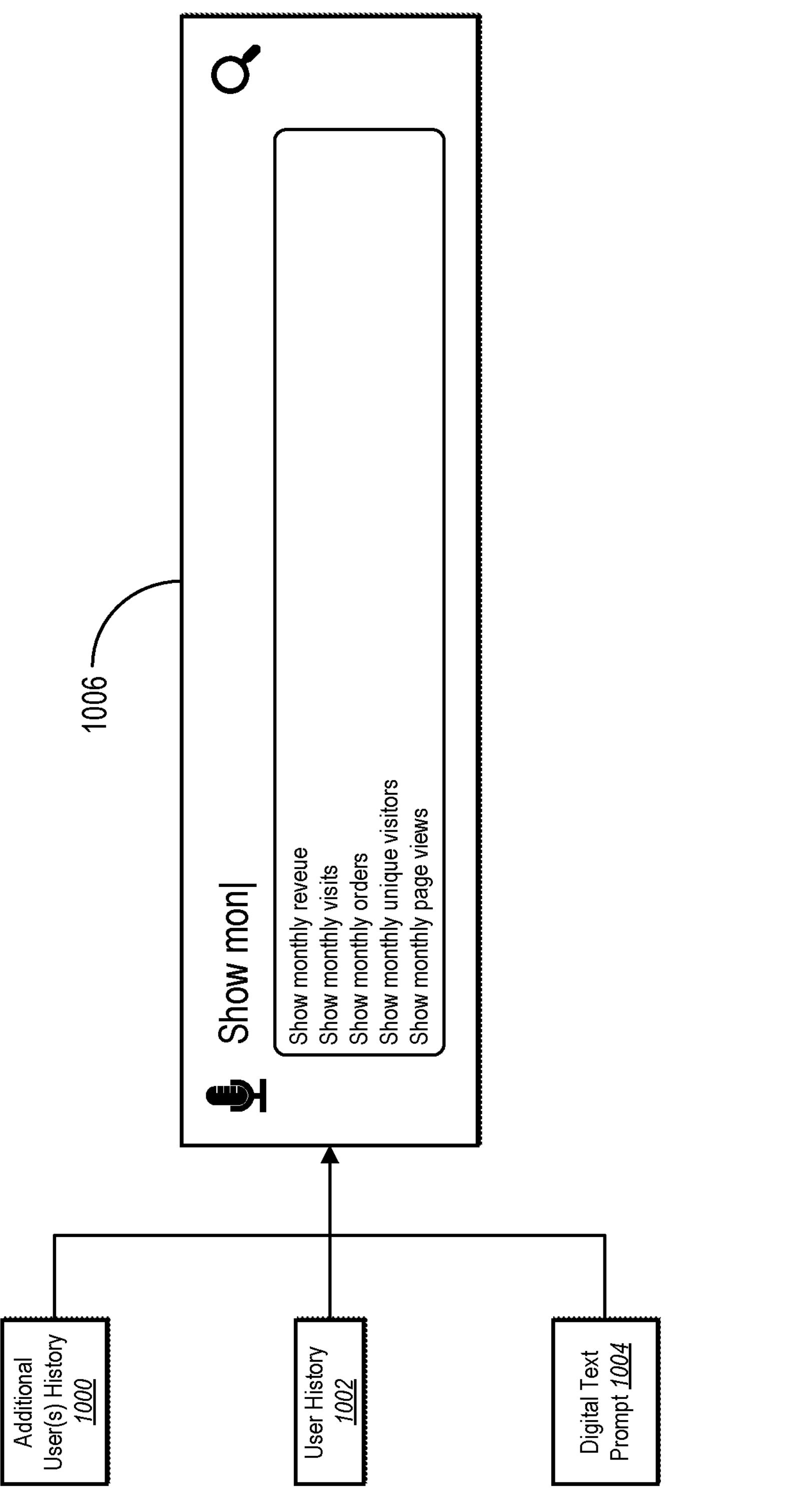
FIG. 10 illustrates a diagram of the digital analytics visualization system generating automatic suggestions for a digital text prompt in accordance with one or more embodiments.

FIG. 10 illustrates the digital analytics visualization system 102 generating automatic suggestions for a digital text prompt in accordance with one or more embodiments. For instance, FIG. 10 shows the digital analytics visualization system 102 processing as input, additional user(s) history 1000, user history 1002, and a digital text prompt 1004 to generate automatic suggestions 1006. For example, the additional user(s) history 1000 includes historical results of digital text prompts submitted by additional users. Further, the user history 1002 includes historical results of digital text prompts submitted by the current user. Moreover, the digital text prompt 1004 includes the current digital text prompt (e.g., being inputted).

For example, FIG. 10 shows the digital analytics visualization system 102 receiving as text input "show mon." In one or more embodiments, the digital analytics visualization system 102 takes the text input "show mon" along with the additional user(s) history 1000 and the user history 1002 and generates the automatic suggestions 1006 "show monthly revenue," "show monthly visits," show monthly orders," "show monthly unique visitors," and "show monthly page views."

In one or more embodiments, the digital analytics visualization system 102 further surfaces popular suggestions for a user from other users within the same group as the user. For instance, based on the user signing into their account via user authentication credentials, the digital analytics visualization system 102 identifies other users within the user's organization. In some embodiments, based on this identification, the digital analytics visualization system 102 populates the graphical use interface with popular digital text prompts submitted by other members of the user's organization.

Figure 11:
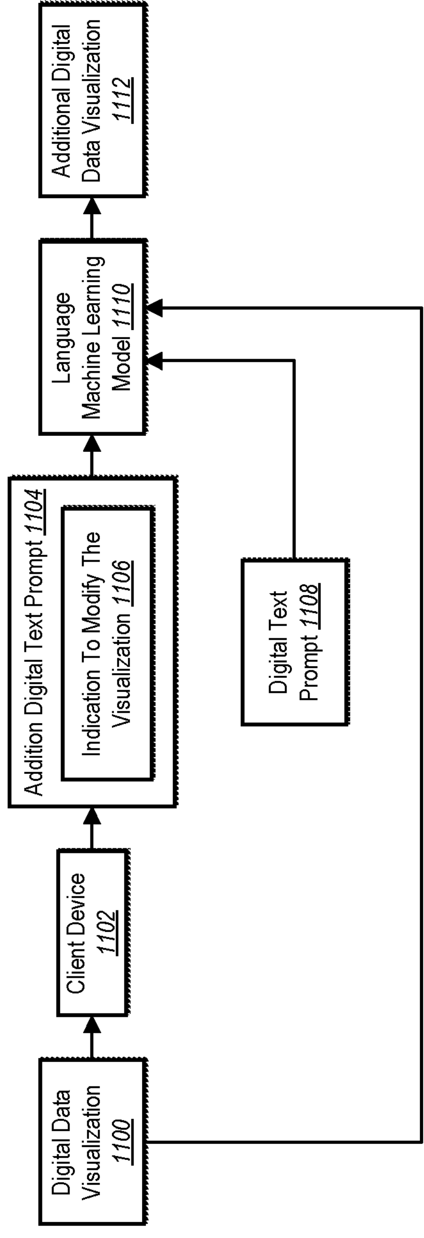
FIG. 11 illustrates a diagram of the digital analytics visualization system receiving an additional digital text prompt to generate an additional digital data visualization in accordance with one or more embodiments.

FIG. 11 illustrates the digital analytics visualization system 102 receiving an additional digital text prompt to generate an additional digital data visualization in accordance with one or more embodiments. For example, FIG. 11 shows the digital analytics visualization system 102 providing a digital data visualization 1100 to a client device 1102 and the digital analytics visualization system 102 further receiving an additional digital text prompt 1104 from the client device 1102.

In one or more embodiments, "the additional digital text prompt" 1104 refers to an additional message or instruction provided in a textual form for an additional digital data visualization 1112 (e.g., different from the target visualization indicated in a digital text prompt 1108). As shown in FIG. 11, the additional digital text prompt 1104 includes an indication 1106 to modify the visualization (e.g., a modification to the initial digital text prompt) via an additional user interaction with the user interface of the client device. For instance, in some embodiments, the additional digital text prompt 1104 changes a single aspect of an initially submitted digital text prompt, while in some instances the additional digital text prompt changes the entirety of the initially submitted digital text prompt. In other words, the additional digital text prompt 1104 includes an indication to modify the target digital data visualization description from the digital text prompt 1108.

Moreover, as shown in FIG. 11, the digital analytics visualization system 102 utilizes the additional digital text prompt 1104, the digital text prompt 1108, and the digital data visualization 1100 as input to a language machine learning model 1110. For example, for each additional iteration of submitting a digital text prompt, the digital analytics visualization system 102 "remembers" the past context by feeding past outputs and/or inputs to the language machine learning model 1110. For instance, the digital analytics visualization system 102 provides to the client device 1102 a chat-like interface to generate multiple iterations of a digital data visualization.

Furthermore, as shown, the digital analytics visualization system 102 via the language machine learning model 1110 generates an additional digital data visualization 1112 from the additional digital text prompt 1104, the digital data visualization 1100, and the digital text prompt 1108 (e.g., utilizing the processes and methods discussed above). In some instances, the additional digital data visualization 1112 includes modifying/tweaking a portion of the digital data visualization 1100, while in some instances the digital analytics visualization system 102 generates anew a digital data visualization.

To reiterate, in one or more embodiments, the digital analytics visualization system 102 establishes an interface for the user to quickly explore their data (e.g., customer specific or organization specific data) without knowing the exact attribute names, chart-types, and values of attributes. As outlined in FIGS. 1-11 the digital analytics visualization system 102 allows a user to input a digital text prompt and the digital analytics visualization system 102 maps one or more words used in the digital text prompt to one or more metrics and one or more dimensions (e.g., attribute keys) specific to the customer or organization's database. Thus, the digital analytics visualization system 102 streamlines the creation of digital data visualizations from a text instruction.

Figure 12A:
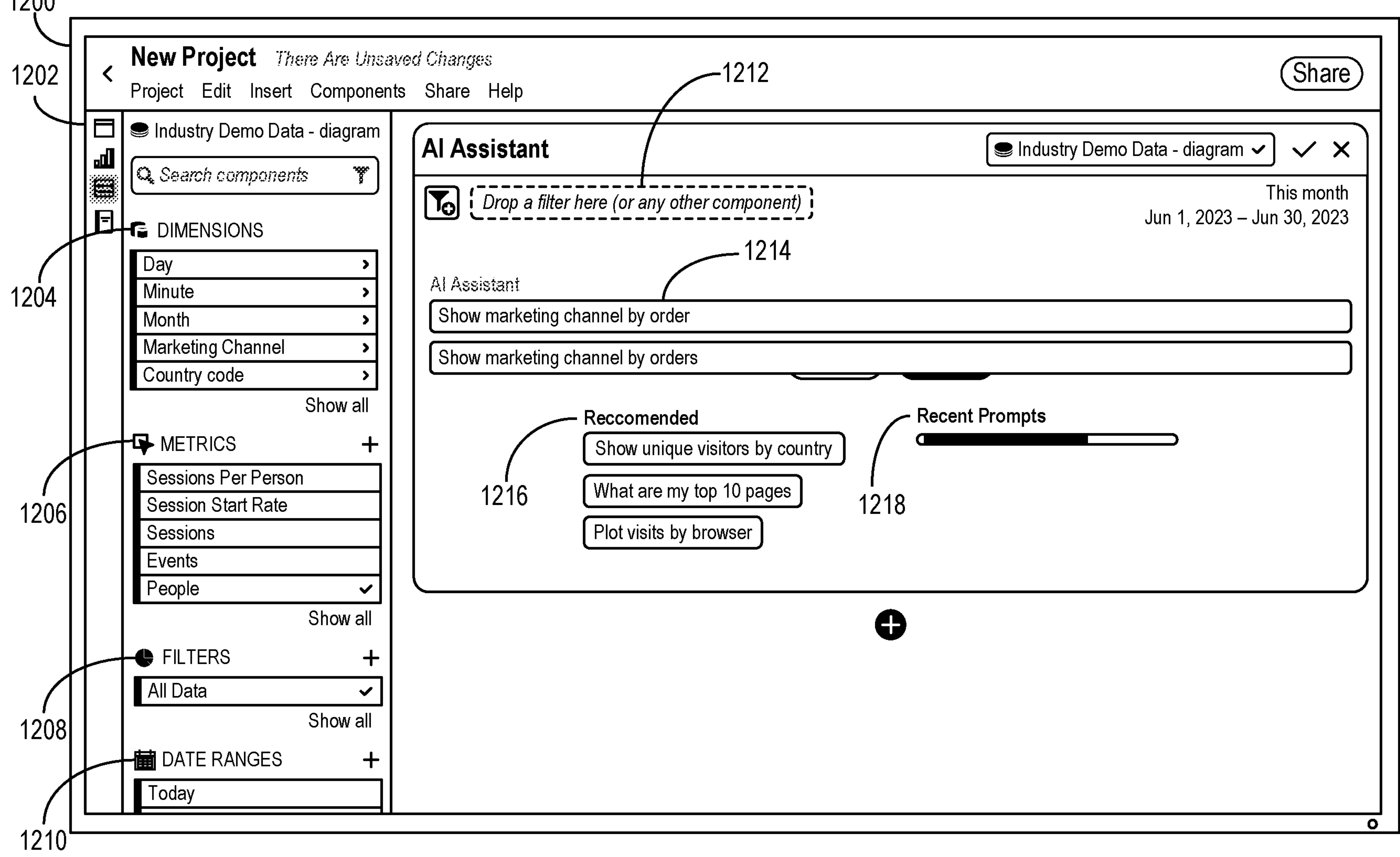
FIGS. 12A-12M illustrates a series of graphical user interfaces that show different digital text prompts and corresponding digital data visualizations in accordance with one or more embodiments.

FIGS. 12A-12M illustrate a series of graphical user interfaces of digital text prompts and generating digital data visualizations based on the digital text prompts in accordance with one or more embodiments. For example, FIG. 12A shows a client device 1200 with a graphical user interface 1202, where the graphical user interface 1202 allows a user to provide instructions to generate a digital data visualization. In particular, FIG. 12A shows a drag-and-drop portion 1212 that allows a user to drag-and-drop one or more of dimensions 1204, metrics 1206, filters 1208, and date ranges 1210. Moreover, because dragging-and-dropping into the drag-and-drop portion 1212 is tedious and time consuming, the digital analytics visualization system 102 also provides a portion of the graphical user interface 1202 for inputting a digital text prompt 1214. Here, the digital text prompt 1214 reads "show marketing channel by order." Furthermore, FIG. 12A shows recommendations 1216 (e.g., generated by the digital analytics visualization system 102 by accessing user history, additional user(s) history, and the digital text prompt 1214 as discussed above in FIG. 10) and recent prompts 1218 (e.g., which displays recently submitted digital text prompts).

Figure 12B:
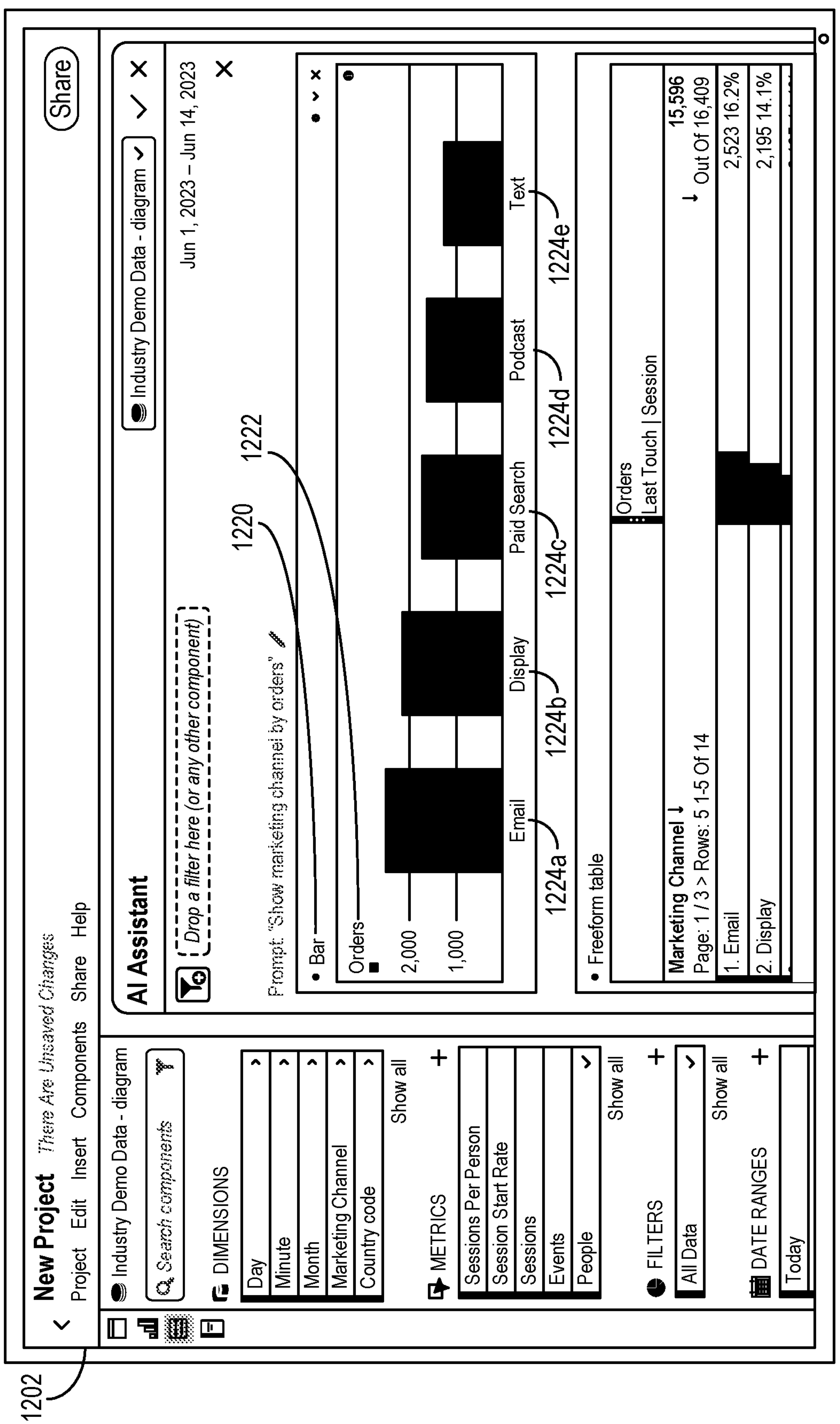

Furthermore, FIG. 12B shows the graphical user interface in response to a user submitting the digital text prompt 1214. For example, FIG. 12B shows the digital analytics visualization system 102 generating a digital data visualization to display via the graphical user interface 1202. In particular, the digital analytics visualization system 102 generates the digital data visualization by sending the digital text prompt 1214 to a language machine learning model, generating a visualization prediction token, modifying the visualization token prediction with a post-processing model to generate a refined visualization token, and building the shown digital data visualization (e.g., with the visualization recommendation model).

For instance, FIG. 12B shows that from the digital text prompt 1214, the digital analytics visualization system 102 identifies "marketing channel" as a dimension value, "order" as a metric value, number of items value as "5" and a time range value of "Jun. 1, 2023, to Jun. 14, 2023." For example, the digital analytics visualization system 102 utilizes the language machine learning model to generate the visualization token prediction that replaces the attribute values within the digital text prompt 1214 with an attribute value from the analytics database. To illustrate, the digital analytics visualization system 102 generates "Show {dimension/marketing channel} by {metric/orders}." Furthermore, the digital analytics visualization system 102 then utilizes the post-processing model (e.g., matching model, string similarity model, semantic similarity model, etc.) to map the attribute keys to a defined attribute value within the analytics database.

As shown in FIG. 12B, the digital analytics visualization system 102 identifies a visualization value of bar plot 1220. For instance, the digital analytics visualization system 102 utilizes the heuristics model of the post-processing model and determines that for showing {dimensions} by {metrics}, the bar plot 1220 best conveys this visualization. For instance, the digital analytics visualization system 102 utilizes the heuristics model which includes a rule to utilize bar plots when there are both dimensions and metrics. For example, the digital analytics visualization system 102 utilizes the heuristics model with a rule that determines a visualization value of bar plot when the digital text prompt contains a comparison or visualization between a single variable across different categories.

As shown in FIG. 12B, the bar plot 1220 further shows orders 1222 by marketing channels (e.g., email 1224*a*, display 1224*b*, paid search 1224*c*, podcast 1224*d*, and text 1224*e*). For instance, the digital analytics visualization system 102 utilizes the post-processing model to identify the defined attribute values of orders for each of the marketing channels.

Figure 12C:
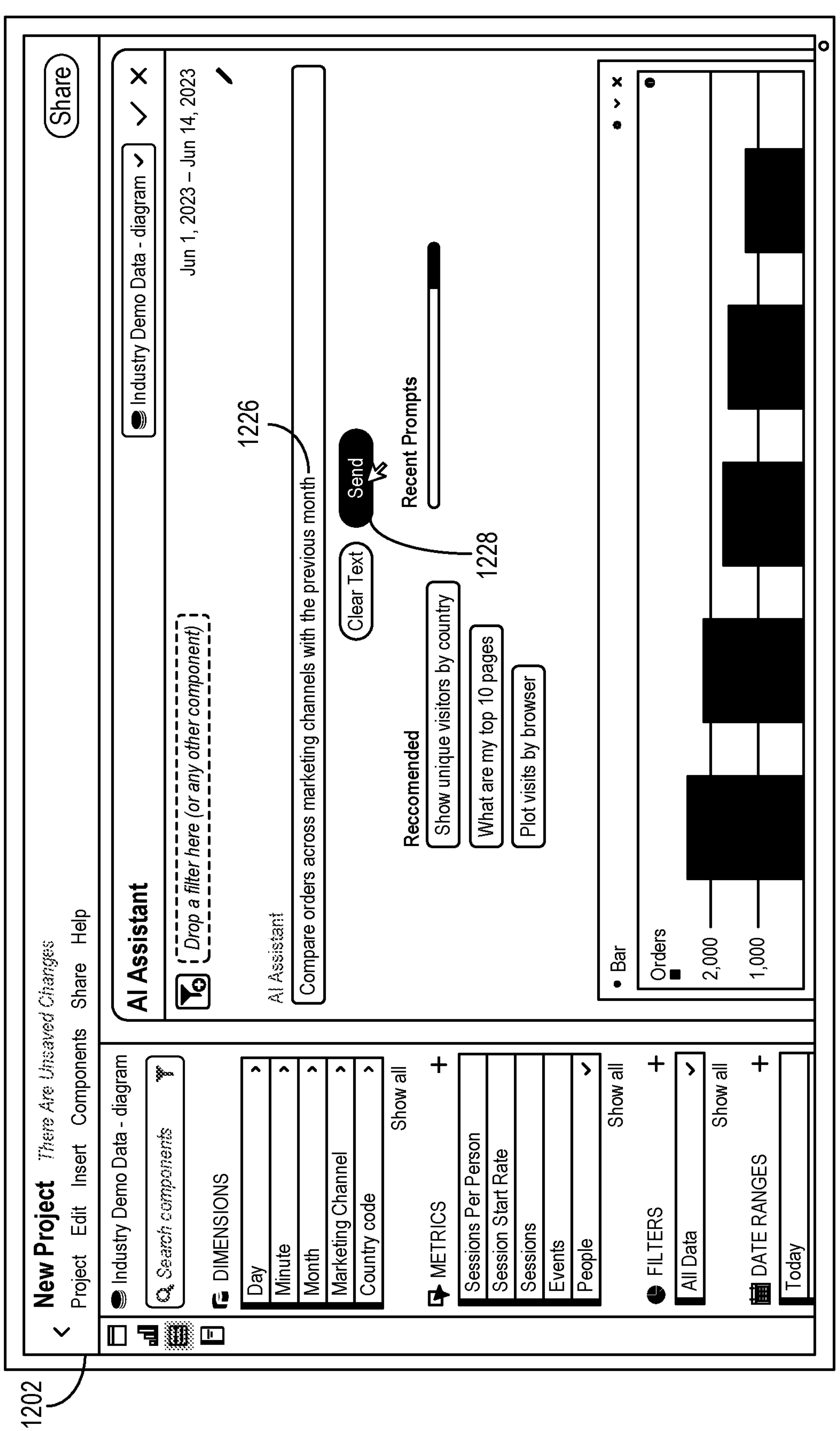

FIG. 12C illustrates the digital analytics visualization system 102 receiving an additional digital text prompt 1226. For example, a user inputs via the graphical user interface 1202 the additional digital text prompt 1226 and selects a send element 1228 to submit the additional digital text prompt 1226. In response to the user selecting the send element 1228, the digital analytics visualization system 102 generates an additional digital data visualization and transitions the graphical user interface 1202 to display FIG. 12D.

Figure 12D:
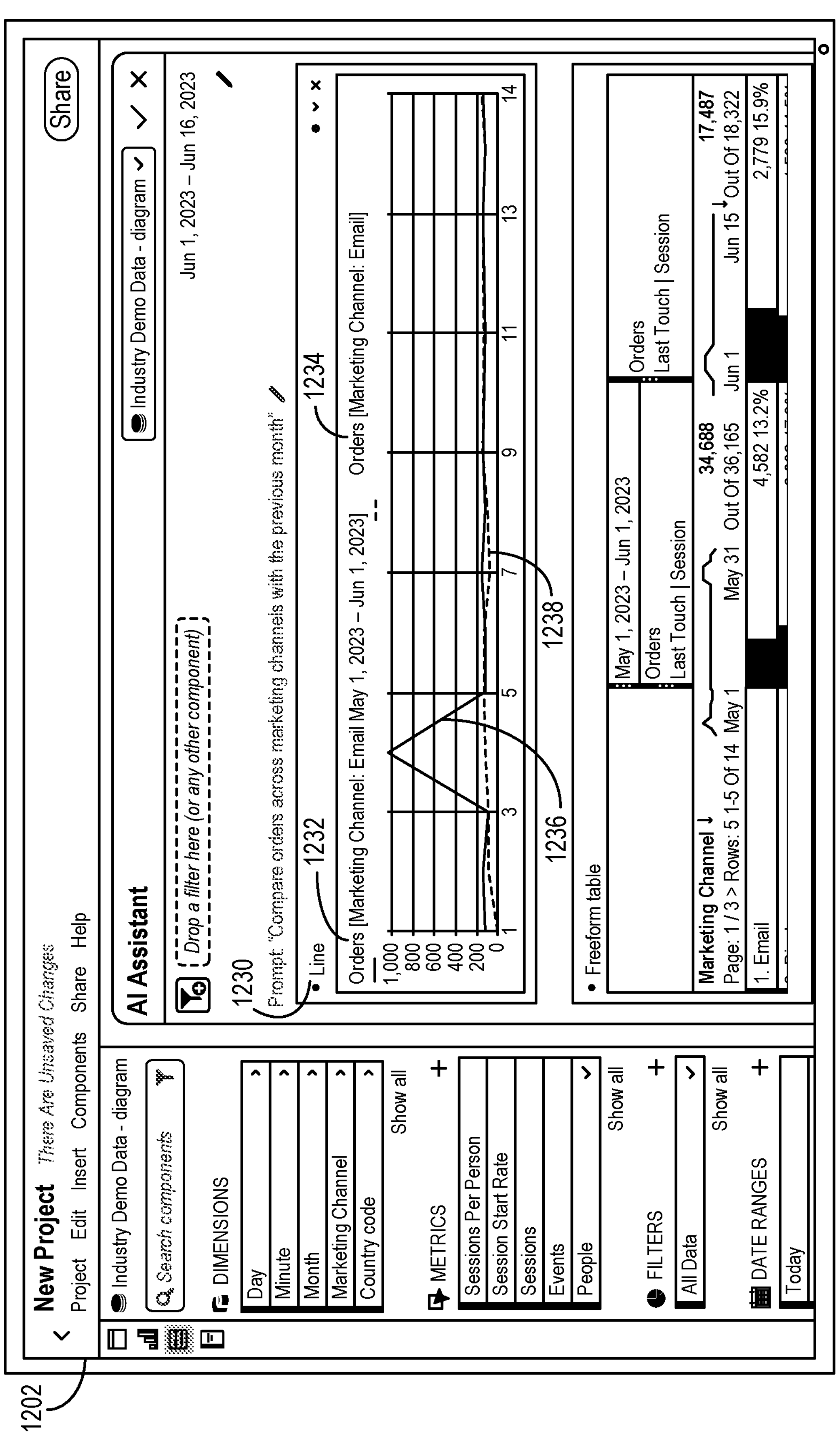

FIG. 12D illustrates an additional digital data visualization according to the additional digital text prompt 1226 that reads "compare orders across marketing channels with the previous month." For example, the digital analytics visualization system 102 conforms with the methods, principles, and processes discussed above to identify the visualization value of line plot 1230. For instance, the digital analytics visualization system 102 determines that a subset of the set of attribute values (e.g., a number of items value for marketing channels) involves an email marketing channel, and the email marketing channel as a single channel fails to satisfy a first attribute threshold. For example, the digital analytics visualization system 102 establishes the first attribute threshold as five for the number of items value. Because the number of items value here is the email marketing channel, the digital analytics visualization system 102 determines the visualization value as the line plot 1230.

As shown, FIG. 12D shows a first line 1236 for orders 1232 of an email marketing channel in the previous month and a second line 1238 for orders 1234 of an email marketing channel in the current month. To illustrate, the digital analytics visualization system 102 identifies the visualization value as "line plot" based on using a heuristic model that associates the word "compare" with a line plot. Further, the digital analytics visualization system 102 utilizes the post-processing model to identify "order" as a metric, the number of items as "2," and a time range of this month versus last month.

Figure 12E:
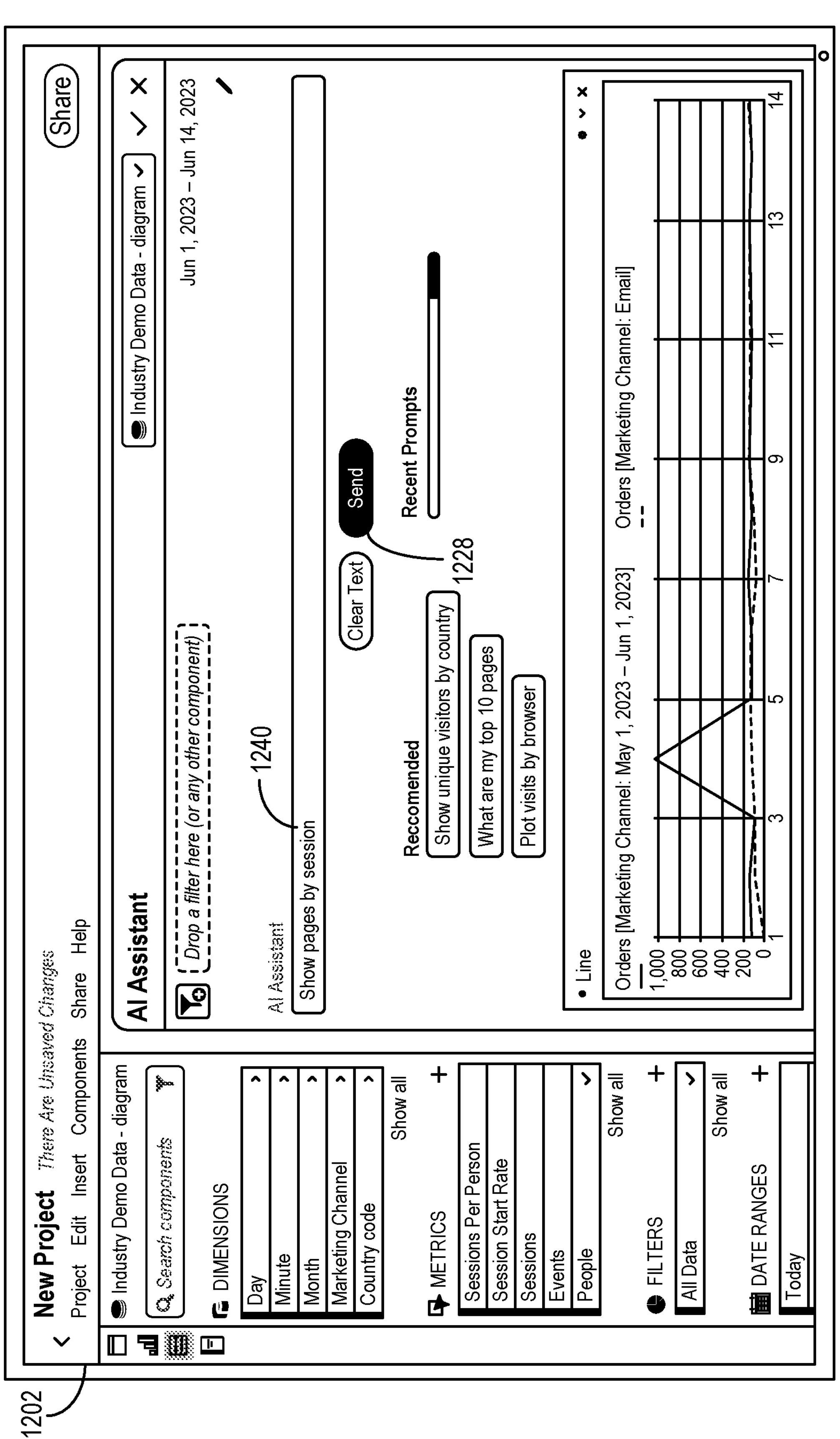
Figure 12F:
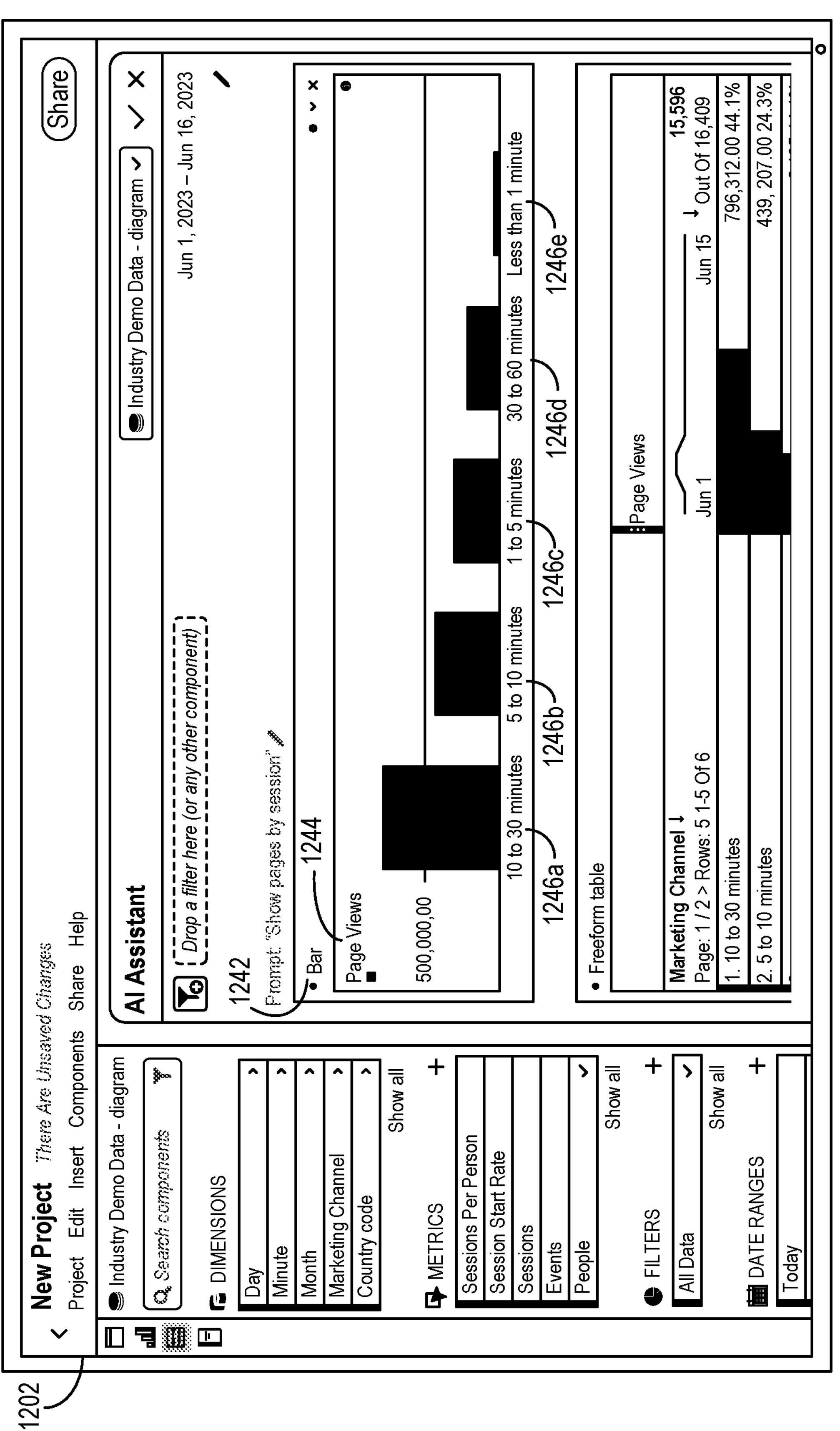

FIG. 12E shows an additional digital text prompt 1240 that reads "show pages by session" and in response to selecting the send element 1228, the digital analytics visualization system 102 causes the graphical user interface 1202 to transition to FIG. 12F. For example, as shown in FIG. 12F, the digital analytics visualization system 102 identifies "pages" as a dimension, "session" as a metric, the number of items as "5," and the time range as Jun. 1, 2023-Jun. 16, 2023. Specifically, as shown in FIG. 12F, the graphical user interface 1202 shows a bar plot 1242, according to page views 1244 per session 1246*a*-1246*e*.

Figure 12G:
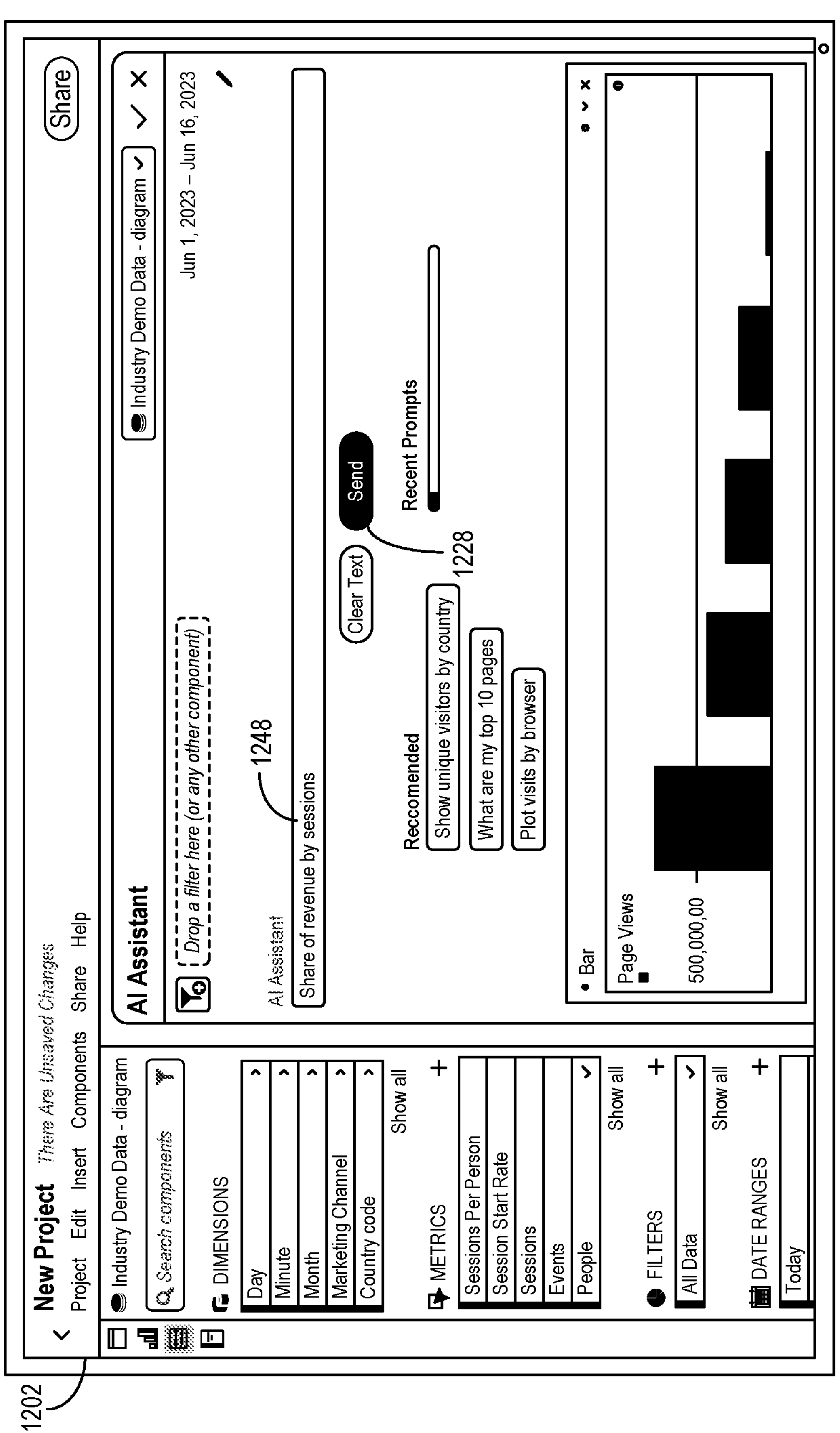
Figure 12H:
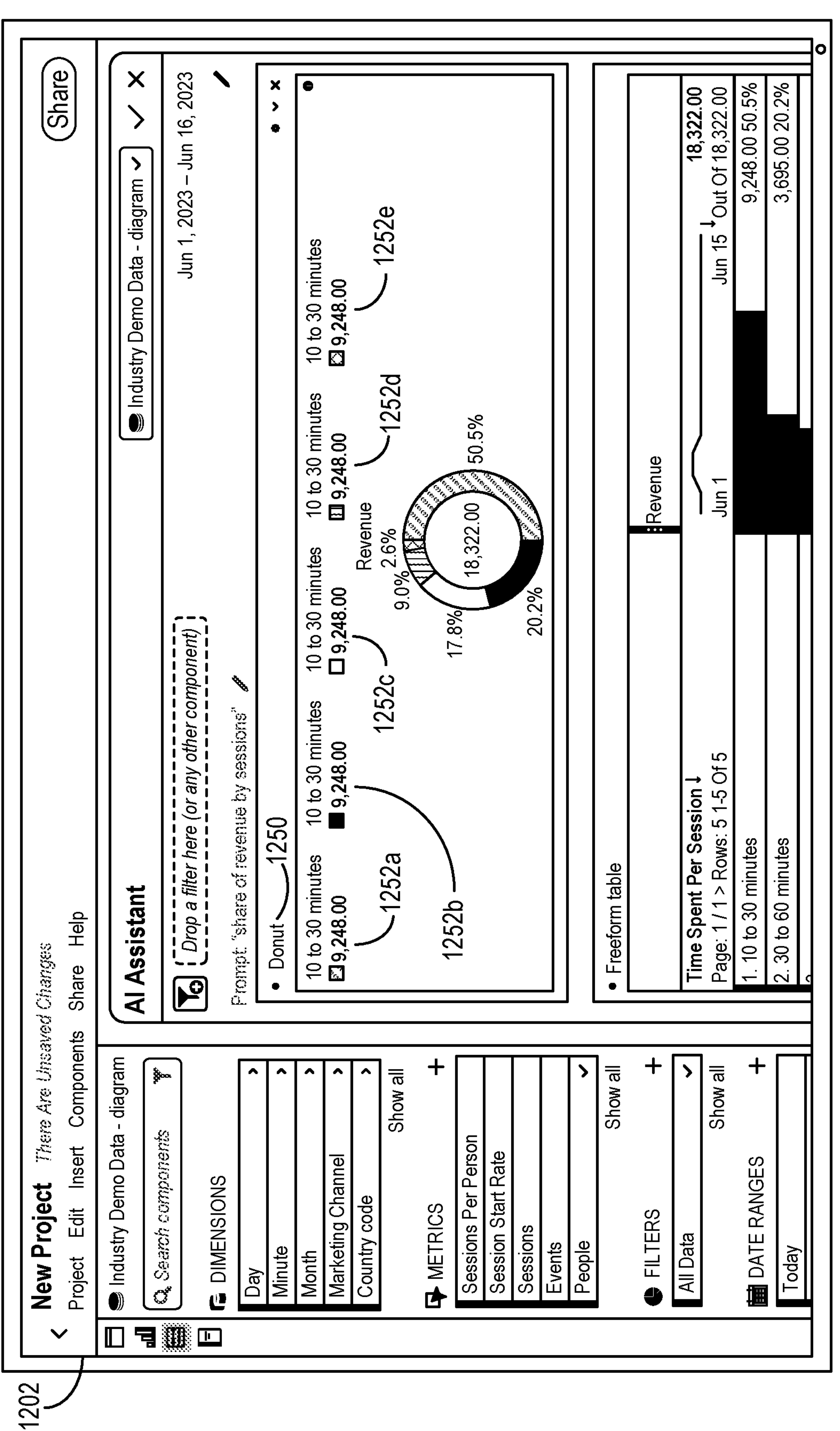

FIG. 12G shows an additional digital text prompt 1248 that reads "share of revenue by sessions" and in response to selecting the send element 1228, the digital analytics visualization system 102 causes the graphical user interface 1202 to transition to FIG. 12H. As shown in FIG. 12H, the digital analytics visualization system 102 identifies the visualization value as "donut," the metric as "revenue," and "session," the number of items as "5," and the time range as Jun. 1, 2023-Jun. 16, 2023. Specifically, FIG. 12H shows a donut plot 1250 according to a distribution of the revenue per different sessions 1252*a*-1252*e*.

For instance, in some embodiments, the digital analytics visualization system 102 utilizes a default time range of the last two weeks when the time range is not specified in the additional digital text prompt 1248. In one or more embodiments, the digital analytics visualization system 102 utilizes a default time range of this month and last month when the digital text prompt indicates a comparison. Further, in some embodiments, to obtain the time range based on a default time range rule, the digital analytics visualization system 102 utilizes an API call to fetch the current time and date and sets the time range value with the fetched data. In some instances, rather than utilizing the default time range rule, the digital analytics visualization system 102 utilizes a time range value as expressed in the digital text prompt or predicted from the language machine learning model.

Figure 12I:
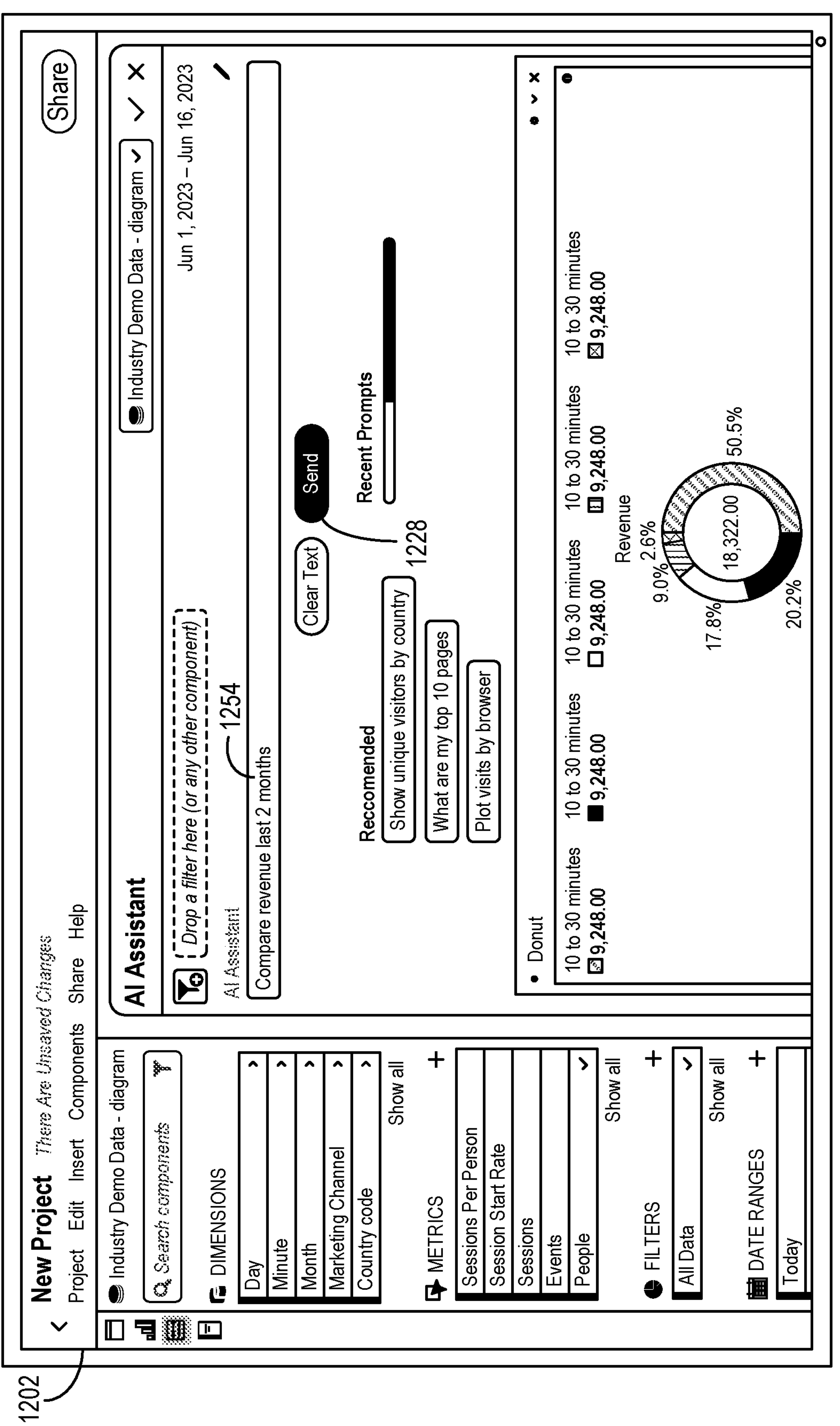
Figure 12J:
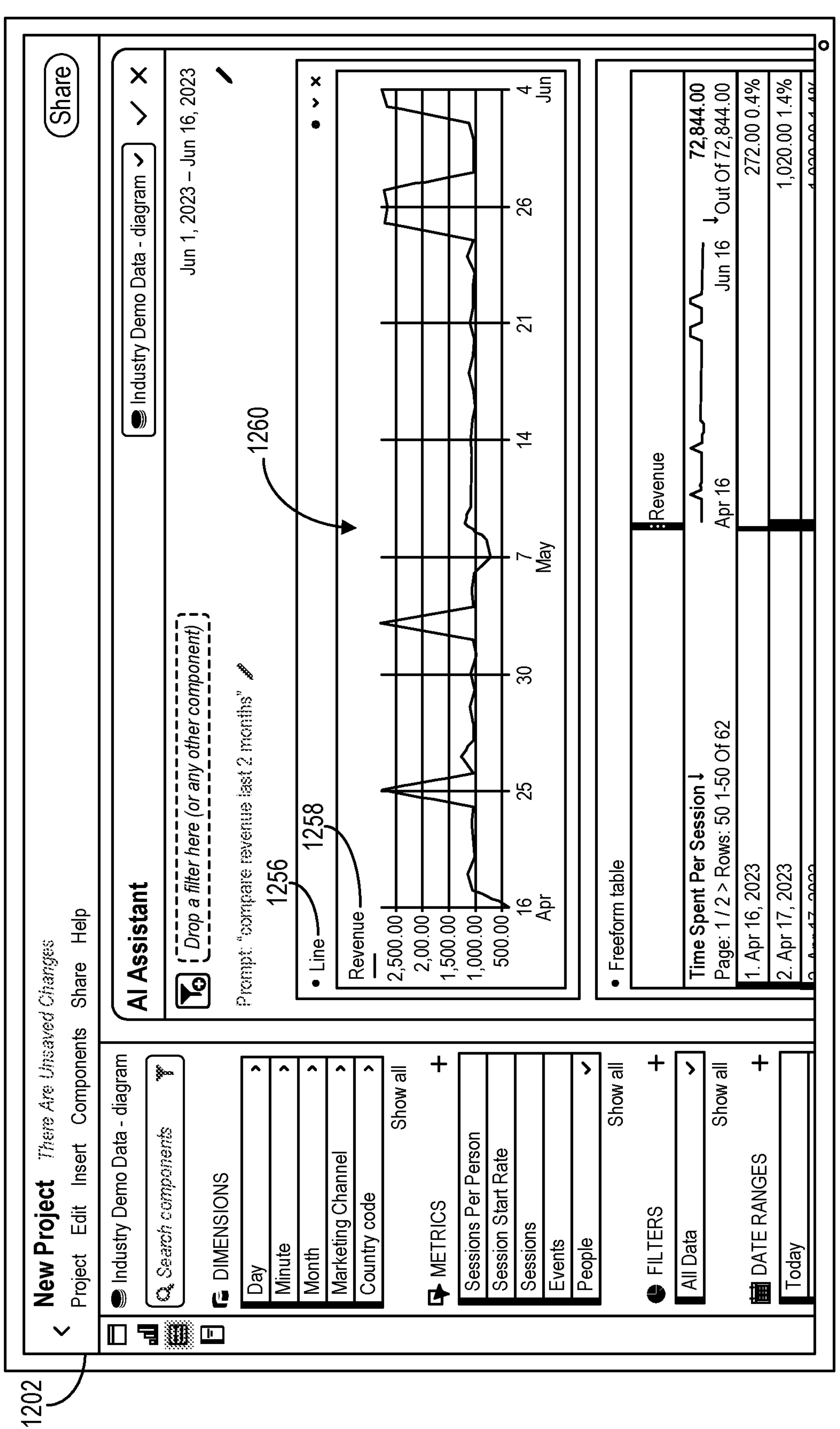

FIG. 12I shows an additional digital text prompt 1254 that reads "compare revenue last 2 months" and in response to selecting the send element 1228, the digital analytics visualization system 102 causes the graphical user interface 1202 to transition to FIG. 12J. For example, in FIG. 12J, the digital analytics visualization system 102 identifies the visualization value as line, "revenue" as metric and the time range as spanning the last two months. Specifically, FIG. 12J shows a line plot 1256 according to revenue 1258 of a time range 1260 (e.g., April to June).

Figure 12K:
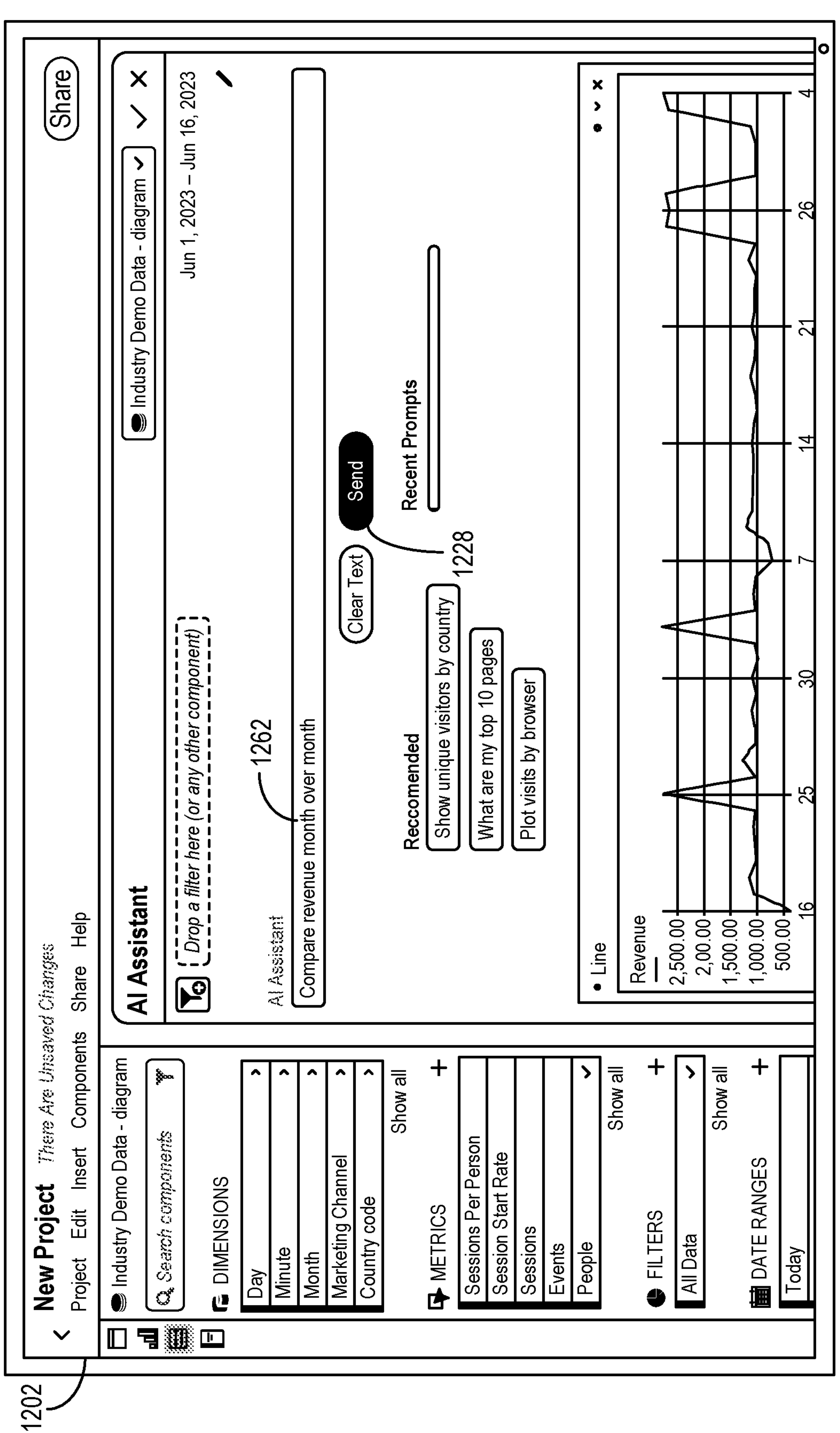
Figure 12L:
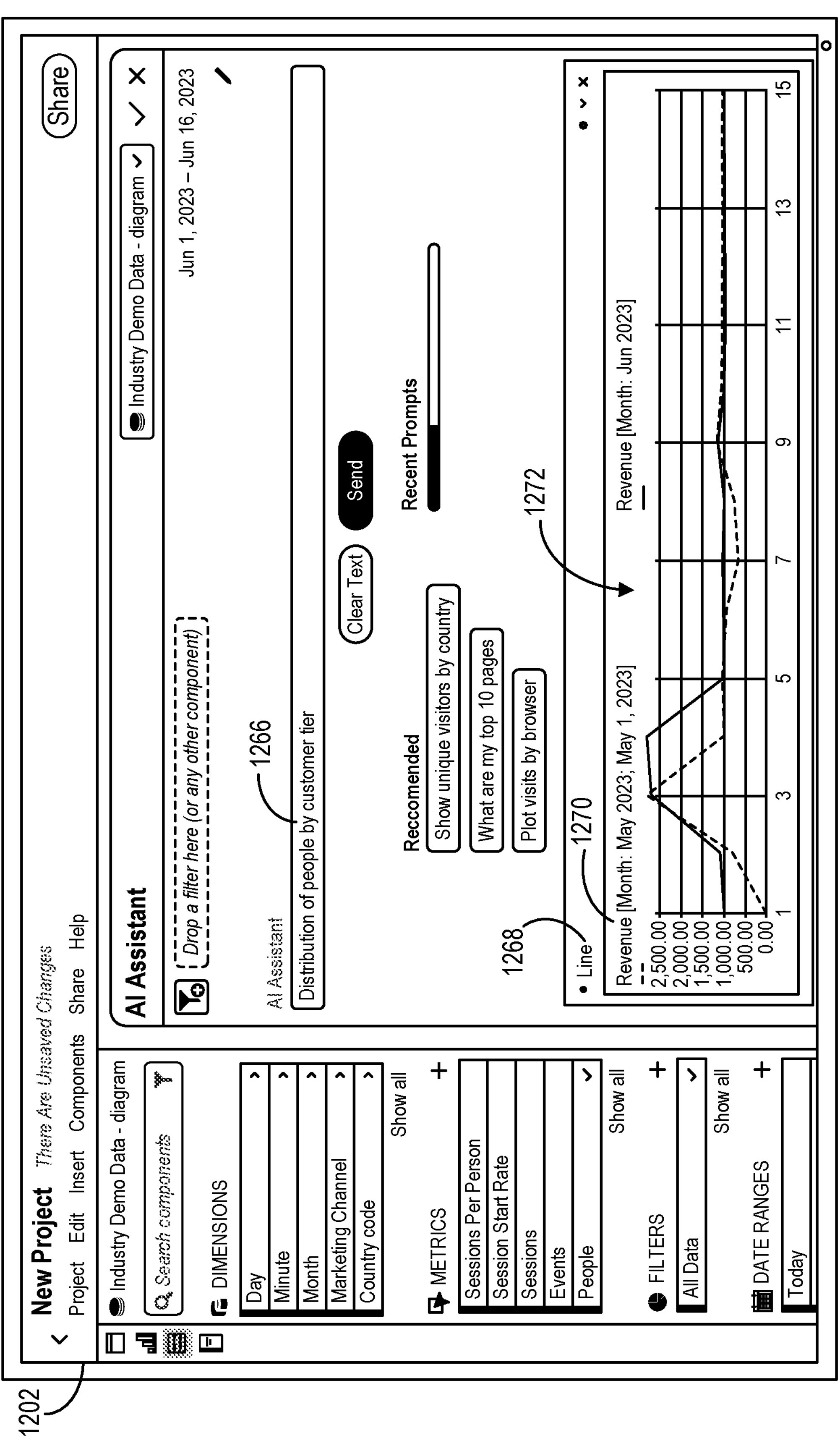

FIG. 12K shows an additional digital text prompt 1262 that reads "compare revenue month over month" and in response to selecting the send element 1228, the digital analytics visualization system 102 causes the graphical user interface 1202 to transition to FIG. 12L. FIG. 12L shows the digital analytics visualization system 102 identifying the visualization value as line, the dimension as "customer tier" and the time range of May to June. Specifically, FIG. 12L shows a line plot 1268 according to revenue 1270 for a time range 1272 from May to June.

Figure 12M:
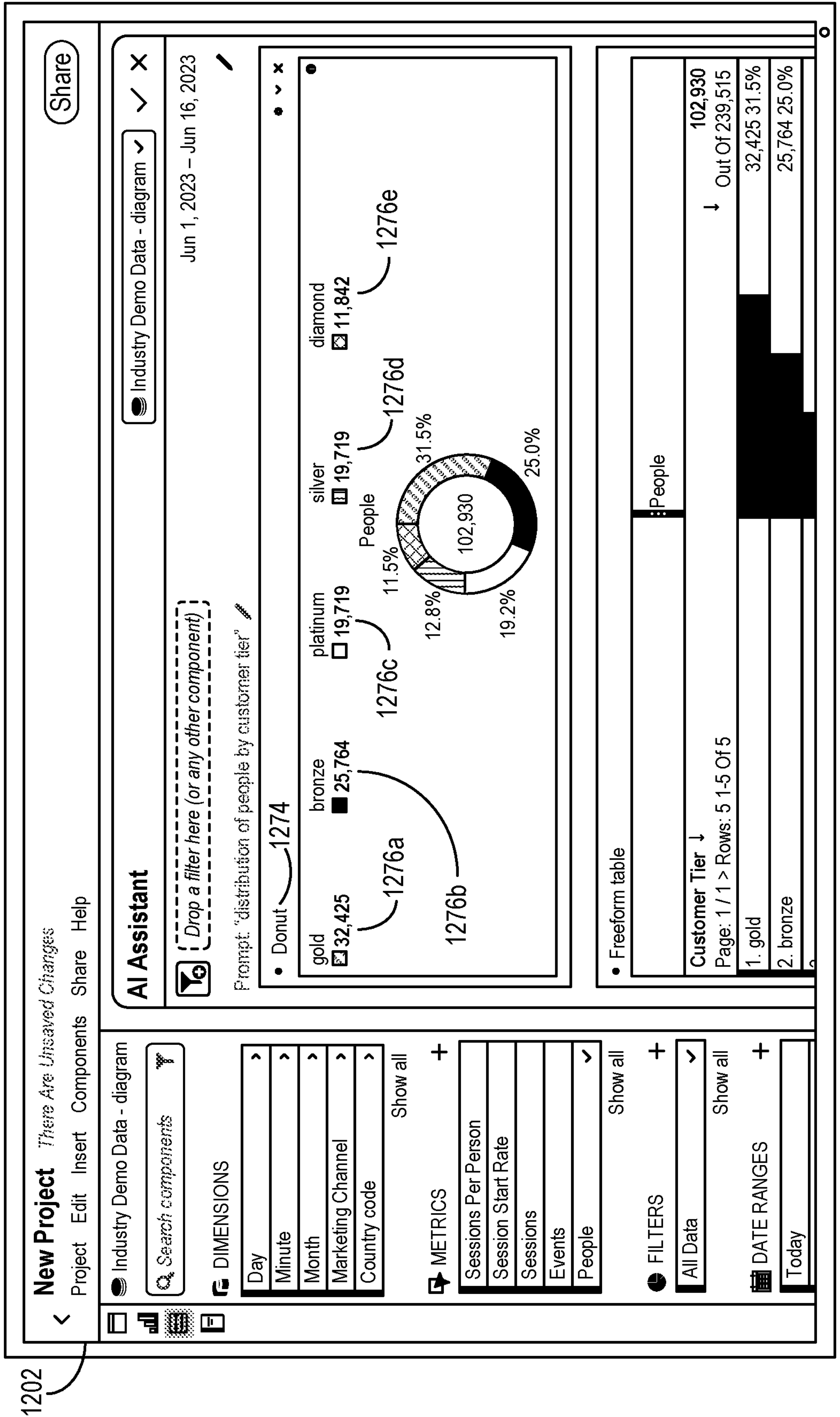

Moreover, FIG. 12L shows an additional digital text prompt 1266 that reads "distribution of people by customer tier." In response to selecting the send element 1228, the digital analytics visualization system 102 causes the graphical user interface 1202 to transition to FIG. 12M. As shown in FIG. 12M, the digital analytics visualization system 102 identifies the visualization value as donut, the dimension as "customer tier" and the time range as "Jun. 1, 2023-Jun. 16, 2023." Specifically, FIG. 12M shows a donut plot 1274 according to customer tiers **1276*a*-1276*e***.

Figure 13:
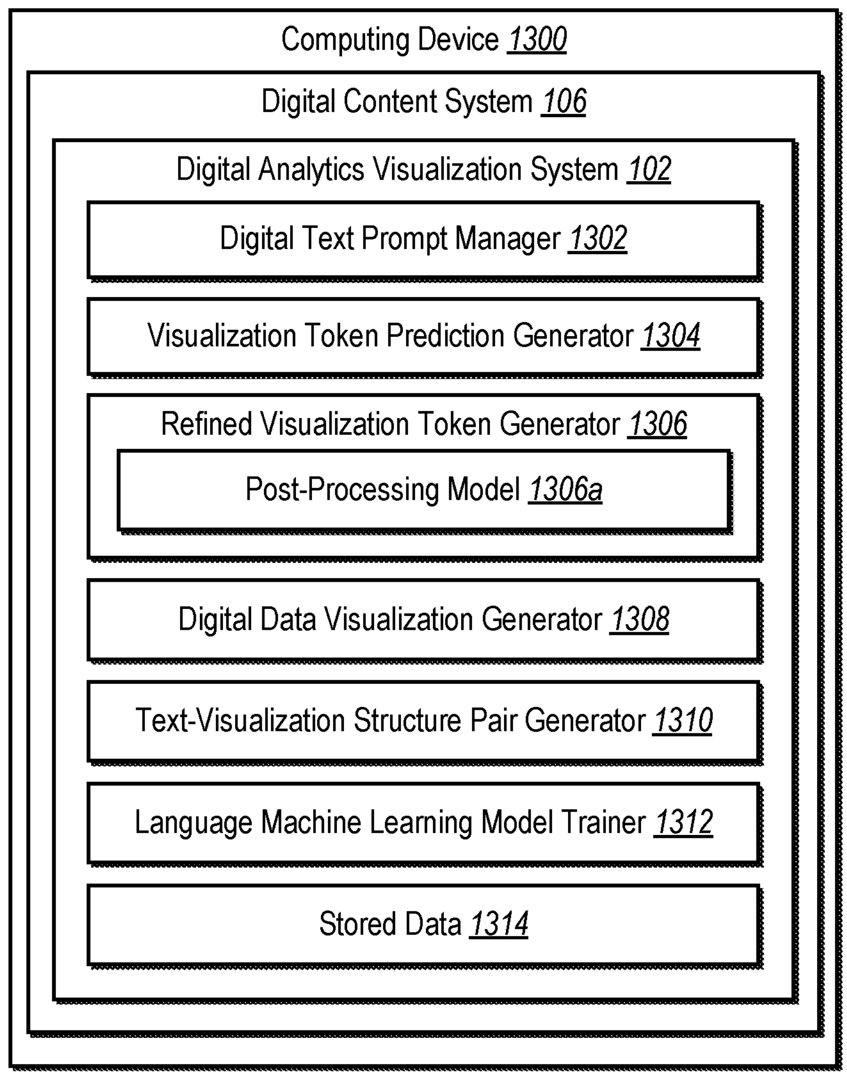
FIG. 13 illustrates a schematic diagram of the digital analytics visualization system in accordance with one or more embodiments.

Turning to FIG. 13, additional detail will now be provided regarding various components and capabilities of the digital analytics visualization system 102. In particular, FIG. 13 illustrates an example schematic diagram of a computing device 1300 (e.g., the server(s) 104 and/or the client device 116) implementing the digital analytics visualization system 102 in accordance with one or more embodiments of the present disclosure for components 1300-1314. As illustrated in FIG. 13, the digital analytics visualization system 102 includes a digital text prompt manager 1302, a visualization token prediction generator 1304, a refined visualization token generator 1306, a post-processing model **1306*a*, a digital data visualization generator 1308, a text-visualization structure pair generator 1310, a language machine learning model trainer 1312, and stored data 1314**.

The digital text prompt manager 1302 receives digital text prompts. For example, the digital text prompt manager 1302 receives via user input, the digital text prompts that contain instructions to generate a digital data visualization. In particular, the digital text prompt manager 1302 determines whether to utilize a paraphrasing model to shorten or reword a received digital text prompt. Furthermore, the digital text prompt manager 1302 also interprets one or more user interactions with a user interface of a client device and passes the digital text prompt to a language machine learning model.

The visualization token prediction generator 1304 generates visualization token predictions. For example, the visualization token prediction generator 1304 generates visualization token predictions from the digital text prompt received from the digital text prompt manager 1302 using the language machine learning model. Furthermore, the visualization token prediction generator 1304 extracts one or more values from the digital text prompt and replaces it with attribute keys. In other words, the visualization token prediction generator 1304 generates structured outputs that indicate a specific digital data visualization.

The refined visualization token generator 1306 modifies the visualization token predictions. For example, the refined visualization token generator 1306 modifies the visualization token predictions from the digital text prompt to generate refined visualization tokens. For instance, the refined visualization token generator 1306 utilizes a post-processing model **1306*a* to perform various operations on the visualization token predictions to refine it for conforming with an analytics database. Thus, the refined visualization token generator 1306 generates a refined structured output and passes it to the digital data visualization generator 1308**.

The digital data visualization generator 1308 generates a digital data visualization. For example, the digital data visualization generator 1308 generates the digital data visualization from data of an analytics database guided by the structure of the refined visualization tokens. Further, the digital data visualization generator 1308 provides the digital data visualization to a graphical user interface of a client device. Moreover, the digital data visualization generator 1308 utilizes a visualization recommendation model to build the visualization from the refined visualization token utilizing one or more of data binding, API integration, and data configuration.

The digital data visualization generator 1308 generates a dataset of text-visualization structure pairs. For example, the digital data visualization generator 1308 receives a training template and populates feature fields of the training template with values from a structural feature token. In other words, the digital data visualization generator 1308 takes ground truth data visualization data and works backwards to abstract a structured output. Furthermore, the digital data visualization generator 1308 populates the training template with values from the structured output to create a training digital text prompt.

The language machine learning model trainer 1312 trains a language machine learning model with the dataset of text-visualization structure pairs. For example, the language machine learning model trainer 1312 generates a visualization token prediction from the training digital text prompt and further compares the visualization token prediction to the structural feature token. Moreover, based on the comparison, the language machine learning model trainer 1312 modifies parameters of the language machine learning model.

The stored data 1314 stores the digital text prompts, the visualization token predictions, the refined visualization tokens, and the digital data visualizations. For example, the stored data 1314 caches/stores the aforementioned data and utilizes it for additional iterations of training (e.g., fine-tuning) and/or saves the aforementioned data for later access by a user. Accordingly, the digital analytics visualization system 102 references the stored data 1314 for various purposes such as training and providing additional digital data visualizations to a user.

Each of the components 1302-1314 of the digital analytics visualization system 102 can include software, hardware, or both. For example, the components 1302-1314 can include one or more instructions stored on a computer-readable storage medium and executable by processors of one or more computing devices, such as a client device or server device. When executed by the one or more processors, the computer-executable instructions of the digital analytics visualization system 102 can cause the computing device(s) to perform the methods described herein. Alternatively, the components 1302-1314 can include hardware, such as a special-purpose processing device to perform a certain function or group of functions. Alternatively, the components 1302-1314 of the digital analytics visualization system 102 can include a combination of computer-executable instructions and hardware.

Furthermore, the components 1302-1314 of the digital analytics visualization system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1302-1314 of the digital analytics visualization system 102 may be implemented as a stand-alone application, such as a desktop or mobile application. Furthermore, the components 1302-1314 of the digital analytics visualization system 102 may be implemented as one or more web-based applications hosted on a remote server. Alternatively, or additionally, the components 1302-1314 of the digital analytics visualization system 102 may be implemented in a suite of mobile device applications or "apps." For example, in one or more embodiments, the digital analytics visualization system 102 can comprise or operate in connection with digital software applications such as ADOBE® ANALYTICS, ADOBE® MARKETING CLOUD, ADOBE® EXPERIENCE CLOUD, ADOBE® AUDIENCE MANAGER, ADOBE® TARGET, ADOBE® CAMPAIGN, ADOBE® EXPERIENCE MANAGER, ADOBE® ADVERTISING CLOUD, and ADOBE® JOURNEY OPTIMIZER. The foregoing are either registered trademarks or trademarks of Adobe Inc. in the United States and/or other countries.

FIGS. 1-13, the corresponding text, and the examples provide a number of different methods, systems, devices, and non-transitory computer-readable media of the digital analytics visualization system 102. In addition to the foregoing, one or more embodiments can also be described in terms of flowcharts comprising acts for accomplishing the particular result, as shown in FIG. 14. FIG. 14 may be performed with more or fewer acts. Further, the acts may be performed in different orders. Additionally, the acts described herein may be repeated or performed in parallel with one another or in parallel with different instances of the same or similar acts.

FIG. 14 illustrates a flowchart of a series of acts 1400 for generating a digital data visualization in accordance with one or more embodiments. FIG. 14 illustrates acts according to one embodiment, alternative embodiments may omit, add to, reorder, and/or modify any of the acts shown in FIG. 14. In some implementations, the acts of FIG. 14 are performed as part of a method. For example, in some embodiments, the acts of FIG. 14 are performed as part of a computer-implemented method. Alternatively, a non-transitory computer-readable medium can store instructions thereon that, when executed by at least one processor, cause a computing device to perform the acts of FIG. 14. In some embodiments, a system performs the acts of FIG. 14. For example, in one or more embodiments, a system includes at least one memory device. The system further includes at least one server device configured to cause the system to perform the acts of FIG. 14.

The series of acts 1400 includes an act 1402 of receiving, a digital text prompt comprising a target digital data visualization description. Further, the series of acts 1400 includes an act 1404 of generating, visualization token predictions from the digital text prompt. For example, the series of acts 1400 includes an act 1406 of modifying, the visualization token predictions from the digital text prompt to generate refined visualization tokens. Further, the series of acts 1400 includes an act 1408 of generating, a digital data visualization from data of an analytics database.

In particular, the act 1402 includes receiving, via user interaction with a user interface of a client device, a digital text prompt comprising a target digital data visualization description Further, the act 1404 includes generating, utilizing a language machine learning model, visualization token predictions from the digital text prompt. Moreover, the act 1406 includes modifying, utilizing a post-processing model, the visualization token predictions from the digital text prompt to generate refined visualization tokens. Furthermore, the act 1408 includes generating, a digital data visualization from data of an analytics database based on the refined visualization tokens.

For example, in one or more embodiments, the series of acts 1400 includes receiving the digital text prompt comprises receiving the target digital data visualization description comprising a target attribute type. In addition, in one or more embodiments, the series of acts 1400 includes generating, utilizing the language machine learning model, the visualization token predictions comprises extracting an attribute value for an attribute key corresponding to the analytics database from the target attribute type of the target digital data visualization description. Further, in one or more embodiments, the series of acts 1400 includes generating the refined visualization tokens by comparing the visualization token predictions with a set of defined attribute values corresponding to the attribute key.

Moreover, in one or more embodiments, the series of acts 1400 includes utilizing a string similarity model to determine a similarity score between the visualization token predictions and a set of defined attribute values corresponding to the attribute key. Further, in one or more embodiments, the series of acts 1400 includes determining that a defined attribute value of the set of defined attribute values satisfies a similarity score threshold. Moreover, in one or more embodiments, the series of acts 1400 mapping the defined attribute value to the attribute key of the visualization token predictions. Further, in one or more embodiments, the series of acts 1400 includes utilizing a semantic similarity model to generate a semantic embedding of a visualization token prediction and a semantic embedding for a defined attribute value corresponding to the attribute key. Moreover, in one or more embodiments, the series of acts 1400 includes based on comparing the semantic embedding of the defined attribute value and the semantic embedding of the visualization token prediction, mapping the defined attribute value to the attribute key of the visualization token prediction.

Additionally, in one or more embodiments, the series of acts 1400 includes generating the visualization token predictions comprises generating an initial segment value for a segment key, an initial time range value for a time range key, an initial number of items value for a number of items key, or an initial visualization value for a visualization key. Moreover, in one or more embodiments, the series of acts 1400 includes mapping, utilizing a heuristic model, the initial segment value, the initial time range value, the initial number of items value, or the initial visualization value to a defined attribute value.

Furthermore, in one or more embodiments, the series of acts 1400 includes generating the refined visualization tokens by generating a set of attribute keys and a set of attribute values. Moreover, in one or more embodiments, the series of acts 1400 includes identifying a subset of the set of attribute keys and a subset of the set of attribute values that indicate a set of digital data visualizations. Moreover, in one or more embodiments, the series of acts 1400 includes generating, utilizing a visualization recommender model, the set of digital data visualizations from the subset of the set of attribute keys and the subset of the set of attribute values to provide to the client device.

Moreover, in one or more embodiments, the series of acts 1400 includes determining the subset of the set of attribute values includes a first attribute value that fails to satisfy a first attribute threshold. Further, in one or more embodiments, the series of acts 1400 includes based on determining that the subset of the set of attribute values includes the first attribute value that fails to satisfy the first attribute threshold, selecting a first type of data visualization for the set of digital data visualizations. Moreover, in one or more embodiments, the series of acts 1400 includes in response to receiving, via an additional user interaction with the user interface of the client device, an additional digital text prompt comprising an indication to modify the target digital data visualization description. Further, in one or more embodiments, the series of acts 1400 includes generating, utilizing the language machine learning model, an additional digital data visualization based on the additional digital text prompt, the digital text prompt, and the digital data visualization to provide to the client device.

Further, in one or more embodiments, the series of acts 1400 includes receiving, based on user interaction via a user interface of a client device, a digital text prompt comprising a target digital data visualization description. Moreover, in one or more embodiments, the series of acts 1400 includes generating, utilizing the language machine learning model, visualization token predictions from the digital text prompt. Further, in one or more embodiments, the series of acts 1400 includes modifying, utilizing the post-processing model, the visualization token predictions to generate refined visualization tokens. Moreover, in one or more embodiments, the series of acts 1400 includes generating a set of digital data visualizations from data of an analytics database based on the refined visualization tokens. Further, in one or more embodiments, the series of acts 1400 includes providing, for display, the set of digital data visualizations to the client device.

In addition, in one or more embodiments, the series of acts 1400 includes receiving the digital text prompt by receiving the target digital data visualization description comprising a first target attribute type and a second target attribute type. Further, in one or more embodiments, the series of acts 1400 includes extracting a first attribute value for a first attribute key corresponding to the analytics database from the first target attribute type of the target digital data visualization description. Moreover, in one or more embodiments, the series of acts 1400 includes extracting a second attribute value for a second attribute key corresponding to the analytics database from the second target attribute type of the target digital data visualization description.

Further, in one or more embodiments, the series of acts 1400 includes generating the refined visualization tokens by comparing the visualization token predictions with a set of defined attribute values corresponding to the first attribute key and the second attribute key. Moreover, in one or more embodiments, the series of acts 1400 includes utilizing a string similarity model to determine a similarity score between the visualization token predictions and a set of defined attribute values corresponding to the first attribute key and the second attribute key. Further, in one or more embodiments, the series of acts 1400 includes utilizing a semantic similarity model to generate a semantic embedding of a visualization token prediction and a semantic embedding for a defined attribute values corresponding to the first attribute key and the second attribute key.

Moreover, in one or more embodiments, the series of acts 1400 includes generating the refined visualization tokens by generating a set of attribute keys and a set of attribute values. Furthermore, in one or more embodiments, the series of acts 1400 includes identify a subset of the set of attribute keys and a subset of the set of attribute values that indicate a set of digital data visualizations to generate, utilizing a visualization recommender model, the set of digital data visualizations from the subset of the set of attribute keys and the subset of the set of attribute values to provide to the client device.

FIG. 15 illustrates a flowchart of a series of acts 1500 for training, a language machine learning model in accordance with one or more embodiments. FIG. 15 illustrates acts according to one embodiment, alternative embodiments may omit, add to, reorder, and/or modify any of the acts shown in FIG. 15. In some implementations, the acts of FIG. 15 are performed as part of a method. For example, in some embodiments, the acts of FIG. 15 are performed as part of a computer-implemented method. Alternatively, a non-transitory computer-readable medium can store instructions thereon that, when executed by at least one processor, cause a computing device to perform the acts of FIG. 15. In some embodiments, a system performs the acts of FIG. 15. For example, in one or more embodiments, a system includes at least one memory device. The system further includes at least one server device configured to cause the system to perform the acts of FIG. 15.

The series of acts 1500 includes an act 1502 of generating a dataset of text-visualization structure pairs. Further, the act 1502 includes a sub-act 1502*a* of receiving, a training template and a sub-act 1502*b* of populating, feature fields of the training template based on a structural feature token to generate a training digital text prompt. Moreover, the series of acts 1500 includes an act 1504 of training, a language machine learning model with the dataset. For example, the act 1504 includes a sub-act 1504*a* of generating, a visualization token prediction from the training digital text prompt, and a sub-act 1504*b* of modifying parameters of the language machine learning model.

In particular, the act 1502 includes generating a dataset of text-visualization structure pairs. Further, the sub-act 1502*a* includes receiving a training template comprising a digital text prompt having a feature field. Moreover, the sub-act 1502*b* includes populating the feature field of the training template based on a structural feature token of a ground truth data visualization to generate a training digital text prompt. Furthermore, the act 1504 includes training, a language machine learning model with the dataset of text-visualization structure pairs. Moreover, the sub-act 1504*a* includes generating, utilizing the language machine learning model, a visualization token prediction from the training digital text prompt and the sub-act 1504*b* includes modifying parameters of the language machine learning model by comparing the visualization token prediction to the structural feature token of the ground truth data visualization.

Further, in one or more embodiments, the series of acts 1500 includes receiving the training template further comprises receiving a first training template comprising a first feature field and a first description text and a second training template comprising a second feature field and a second description text. Moreover, in one or more embodiments, the series of acts 1500 includes populating the feature field comprises populating the first feature field and the second feature field based on a first structural feature token and a second structural feature token of the ground truth data visualization.

Further, in one or more embodiments, the series of acts 1500 includes populating the first feature field comprises population at least one of a metric feature field or a dimension feature field. Moreover, in one or more embodiments, the series of acts 1500 includes populating the second feature field comprises populating at least one of a segment feature field, a number of items feature field, a time feature field, or a visualization feature field. Further, in one or more embodiments, the series of acts 1500 includes extracting the structural feature token by extracting an attribute value of an attribute key corresponding to the ground truth data visualization. Moreover, in one or more embodiments, the series of acts 1500 includes based on determining a correspondence between the attribute key and the feature field, populating the feature field of the training template utilizing the attribute value. Further, in one or more embodiments, the series of acts 1500 includes extracting an attribute value from the training digital text prompt for an attribute key to generate the visualization token prediction.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 16:
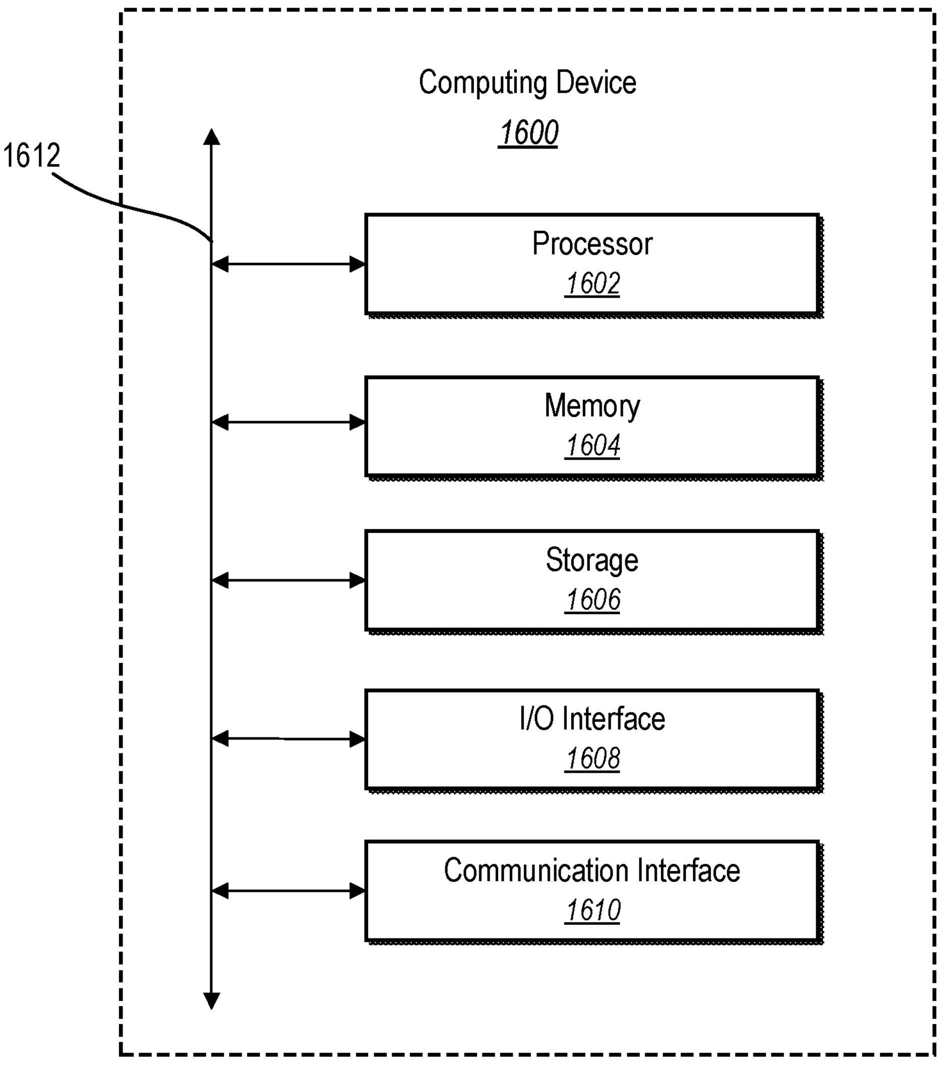
FIG. 16 illustrates a block diagram of an exemplary computing device in accordance with one or more embodiments.

FIG. 16 illustrates a block diagram of an example computing device 1600 that may be configured to perform one or more of the processes described above. One will appreciate that one or more computing devices, such as the computing device 1600 may represent the computing devices described above (e.g., the server(s) 104 and/or the client device 116). In one or more embodiments, the computing device 1600 may be a mobile device (e.g., a mobile telephone, a smartphone, a PDA, a tablet, a laptop, a camera, a tracker, a watch, a wearable device). In some embodiments, the computing device 1600 may be a non-mobile device (e.g., a desktop computer or another type of client device). Further, the computing device 1600 may be a server device that includes cloud-based processing and storage capabilities.

As shown in FIG. 16, the computing device 1600 can include one or more processor(s) 1602, memory 1604, a storage device 1606, input/output interfaces 1608 (or "I/O interfaces 1608"), and a communication interface 1610, which may be communicatively coupled by way of a communication infrastructure (e.g., bus 1612). While the computing device 1600 is shown in FIG. 16, the components illustrated in FIG. 16 are not intended to be limiting. Additional or alternative components may be used in other embodiments. Furthermore, in certain embodiments, the computing device 1600 includes fewer components than those shown in FIG. 16. Components of the computing device 1600 shown in FIG. 16 will now be described in additional detail.

In particular embodiments, the processor(s) 1602 includes hardware for executing instructions, such as those making up a computer program. As an example, and not by way of limitation, to execute instructions, the processor(s) 1602 may retrieve (or fetch) the instructions from an internal register, an internal cache, memory 1604, or a storage device 1606 and decode and execute them.

The computing device 1600 includes memory 1604, which is coupled to the processor(s) 1602. The memory 1604 may be used for storing data, metadata, and programs for execution by the processor(s). The memory 1604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1604 may be internal or distributed memory.

The computing device 1600 includes a storage device 1606 including storage for storing data or instructions. As an example, and not by way of limitation, the storage device 1606 can include a non-transitory storage medium described above. The storage device 1606 may include a hard disk drive (HDD), flash memory, a Universal Serial Bus (USB) drive or a combination these or other storage devices.

As shown, the computing device 1600 includes one or more I/O interfaces 1608, which are provided to allow a user to provide input to (such as user strokes), receive output from, and otherwise transfer data to and from the computing device 1600. These I/O interfaces 1608 may include a mouse, keypad or a keyboard, a touch screen, camera, optical scanner, network interface, modem, other known I/O devices or a combination of such I/O interfaces 1608. The touch screen may be activated with a stylus or a finger.

The I/O interfaces 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1608 are configured to provide graphical data to a display for presentation to a user. The graphical data may be representative of one or more graphical user interfaces and/or any other graphical content as may serve a particular implementation.

The computing device 1600 can further include a communication interface 1610. The communication interface 1610 can include hardware, software, or both. The communication interface 1610 provides one or more interfaces for communication (such as, for example, packet-based communication) between the computing device and one or more other computing devices or one or more networks. As an example, and not by way of limitation, communication interface 1610 may include a network interface controller (NIC) or network adapter for communicating with an Ethernet or other wire-based network or a wireless NIC (WNIC) or wireless adapter for communicating with a wireless network, such as a WI-FI. The computing device 1600 can further include a bus 1612. The bus 1612 can include hardware, software, or both that connects components of computing device 1600 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:

receiving, via user interaction with a user interface of a client device that is part of an entity environment and has access permissions to access an entity-specific analytics database, a digital text prompt comprising a target digital data visualization description; and generating a digital data visualization from translating text instruction data indicated by the digital text prompt utilizing a language machine learning model and a post-processing model by:

generating visualization token predictions by, utilizing the language machine learning model to analyze the digital text prompt and extract an initial attribute value and an attribute key from the digital text prompt;

accessing a set of defined attribute values corresponding to the entity-specific analytics database, wherein the set of defined attribute values are associated with attribute keys;

generating refined visualization tokens based on utilizing the post-processing model to correct inconsistencies in the visualization token predictions generated by the language machine learning model relative to the set of defined attribute values corresponding to the entity-specific analytics database by:

generating a similarity score based on comparing, utilizing a similarity model, the set of defined attribute values corresponding to the attribute key with the visualization token predictions generated by the language machine learning model;

generating a semantic embedding similarity based on comparing, utilizing a semantic similarity model, the set of defined attribute values corresponding to the attribute key with the visualization token predictions generated by the language machine learning model within a machine learning feature space; and generating the refined visualization tokens based on the similarity score and the semantic embedding similarity; and generating, the digital data visualization from data of the entity-specific analytics database based on the refined visualization tokens.

2. The computer-implemented method of claim 1, wherein:

receiving the digital text prompt comprises receiving the target digital data visualization description comprising a textual description of a target attribute type; and generating the digital data visualization comprises identifying a visual graph type based on the textual description of the target attribute type.

3. The computer-implemented method of claim 1, further comprising:

determining the attribute key corresponding to the initial attribute value of the digital text prompt and an additional attribute key corresponding to an additional attribute value of the digital text prompt;

identifying a visual graph type to visually depict the attribute key and the additional attribute key as defined by the set of defined attribute values within the entity-specific analytics database; and generating the digital data visualization that comprises the visual graph type.

4. The computer-implemented method of claim 1, wherein utilizing the similarity model further comprises:

generating, utilizing the similarity model, a plurality of similarity scores between the visualization token predictions and the set of defined attribute values corresponding to the attribute key;

determining that a defined attribute value of the set of defined attribute values satisfies a similarity score threshold, wherein the defined attribute value corresponds to the similarity score of the plurality of similarity scores; and mapping the defined attribute value to the attribute key of the visualization token predictions.

5. The computer-implemented method of claim 1, wherein utilizing the semantic similarity model further comprises:

determining that a defined attribute value corresponding to the semantic embedding similarity satisfies a semantic similarity threshold; and mapping the defined attribute value to the attribute key of the visualization token predictions.

6. The computer-implemented method of claim 1, wherein:

generating the visualization token predictions comprises generating an initial segment value for a segment key, an initial time range value for a time range key, an initial number of items value for a number of items key, or an initial visualization value for a visualization key; and mapping, utilizing a heuristic model, the initial segment value, the initial time range value, the initial number of items value, or the initial visualization value to a defined attribute value.

7. The computer-implemented method of claim 1, further comprising:

generating the refined visualization tokens by generating a set of attribute keys and a set of attribute values;

identifying a subset of the set of attribute keys and a subset of the set of attribute values that indicate a set of digital data visualizations; and generating, utilizing a visualization recommender model, the set of digital data visualizations from the subset of the set of attribute keys and the subset of the set of attribute values to provide to the client device.

8. The computer-implemented method of claim 7, further comprising:

determining the subset of the set of attribute values includes a first attribute value that fails to satisfy a first attribute threshold; and based on determining that the subset of the set of attribute values includes the first attribute value that fails to satisfy the first attribute threshold, selecting a first type of data visualization for the set of digital data visualizations.

9. The computer-implemented method of claim 1, further comprising:

in response to receiving, via an additional user interaction with the user interface of the client device, an additional digital text prompt comprising an indication to modify the target digital data visualization description; and generating, utilizing the language machine learning model, an additional digital data visualization based on the additional digital text prompt, the digital text prompt, and the digital data visualization to provide to the client device.

10. A system comprising:

one or more memory devices comprising a language machine learning model and a post-processing model; and one or more processors configured to cause the system to:

receive, based on user interaction via a user interface of a client device that is part of an entity environment and has access permissions to access an entity-specific analytics database, a digital text prompt comprising a target digital data visualization description;

generate a set of digital data visualizations from translating text instruction data indicated by the digital text prompt utilizing the language machine learning model and the post-processing model by:

generating visualization token predictions by, utilizing the language machine learning model to analyze the digital text prompt and extract an initial attribute value and an attribute key from the digital text prompt;

accessing a set of defined attribute values corresponding to the entity-specific analytics database, wherein the set of defined attribute values are associated with attribute keys; and generating refined visualization tokens based on, utilizing the post-processing model to correct inconsistencies in the visualization token predictions generated by the language machine learning model relative to the set of defined attribute values corresponding to the entity-specific analytics database by:

generating a matching score based on comparing, utilizing a matching model, the set of defined attribute values corresponding to the attribute key with the visualization token predictions generated by the language machine learning model;

generating a similarity score based on comparing, utilizing a similarity model, the set of defined attribute values corresponding to the attribute key with the visualization token predictions generated by the language machine learning model; and generating the refined visualization tokens based on the matching score and the similarity score;

generate the set of digital data visualizations from data of the entity-specific analytics database based on the refined visualization tokens; and provide, for display, the set of digital data visualizations to the client device.

11. The system of claim 10, wherein the one or more processors are configured to cause the system to:

receive the digital text prompt by receiving the target digital data visualization description comprising a first target attribute type and a second target attribute type; and identify a first visual graph type and a second visual graph type based on the first target attribute type and the second target attribute type.

12. The system of claim 11, wherein the one or more processors are configured to cause the system to generate, utilizing the language machine learning model, the visualization token predictions by:

extracting the initial attribute value for the attribute key corresponding to the entity-specific analytics database from the first target attribute type of the target digital data visualization description; and extracting an additional attribute value for an additional attribute key corresponding to the entity-specific analytics database from the second target attribute type of the target digital data visualization description.

13. The system of claim 12, wherein the one or more processors are configured to cause the system to modify, utilizing the post-processing model, the visualization token predictions by generating the refined visualization tokens by comparing the visualization token predictions with a set of defined attribute values corresponding to the attribute key and the additional attribute key.

14. The system of claim 10, wherein the one or more processors are configured to cause the system to utilize a semantic similarity model to generate a semantic embedding similarity based on comparing the set of defined attribute values corresponding to the attribute key with the visualization token predictions generated by the language machine learning model; and generating the refined visualization tokens based on the semantic embedding similarity, the matching score, and the similarity score.

15. The system of claim 10, wherein the one or more processors are configured to cause the system to:

generate the refined visualization tokens by generating a set of attribute keys and a set of attribute values; and identify a subset of the set of attribute keys and a subset of the set of attribute values that indicate the set of digital data visualizations to generate, utilizing a visualization recommender model, the set of digital data visualizations from the subset of the set of attribute keys and the subset of the set of attribute values to provide to the client device.

16. A non-transitory computer-readable medium storing executable instructions which, when executed by at least one processing device, cause the at least one processing device to perform operations comprising:

receiving, via user interaction with a user interface of a client device that is part of an entity environment and has access permissions to access an entity-specific analytics database, a digital text prompt comprising a target digital data visualization description; and generating a digital data visualization from translating text instruction data indicated by the digital text prompt utilizing a language machine learning model and a post-processing model by:

generating visualization token predictions by, utilizing the language machine learning model to analyze the digital text prompt and extract an initial attribute value and an attribute key from the digital text prompt;

accessing a set of defined attribute values corresponding to the entity-specific analytics database, wherein the set of defined attribute values are associated with attribute keys;

generating refined visualization tokens based on, utilizing the post-processing model to correct inconsistencies in the visualization token predictions generated by the language machine learning model relative to the set of defined attribute values corresponding to the entity-specific analytics database that accesses attribute values and attribute keys corresponding to the entity specific analytics database by:

generating a similarity score based on comparing, utilizing a similarity model, the set of defined attribute values corresponding to the attribute key with the visualization token predictions generated by the language machine learning model;

generating a semantic embedding similarity based on comparing, utilizing a semantic similarity model, the set of defined attribute values corresponding to the attribute key with the visualization token predictions generated by the language machine learning model within a machine learning feature space; and generating the refined visualization tokens based on the similarity score and the semantic embedding similarity; and generating, the digital data visualization from data of the entity-specific analytics database based on the refined visualization tokens.

17. The non-transitory computer-readable medium of claim 16, wherein:

receiving the digital text prompt comprises receiving the target digital data visualization description comprising a textual description of a target attribute type; and generating the digital data visualization comprises identifying a visual graph type based on the textual description of the target attribute type.

18. The non-transitory computer-readable medium of claim 16, wherein the operations further comprise:

determining the attribute key corresponding to the initial attribute value of the digital text prompt and an additional attribute key corresponding to an additional attribute value of the digital text prompt;

identifying a visual graph type to visually depict the attribute key and the additional attribute key as defined by the set of defined attribute values within the entity-specific analytics database; and generating the digital data visualization that comprises the visual graph type.

19. The non-transitory computer-readable medium of claim 16, wherein utilizing the similarity model further comprises:

generating, utilizing the similarity model, a plurality of similarity scores between the visualization token predictions and the set of defined attribute values corresponding to the attribute key;

determining that a defined attribute value of the set of defined attribute values satisfies a similarity score threshold, wherein the defined attribute value corresponds to the similarity score of the plurality of similarity scores; and mapping the defined attribute value to the attribute key of the visualization token predictions.

20. The non-transitory computer-readable medium of claim 16, wherein utilizing the semantic similarity model further comprises:

determining that a defined attribute value corresponding to the semantic embedding similarity satisfies a semantic similarity threshold; and mapping the defined attribute value to the attribute key of the visualization token predictions.

* * * * *